(12) United States Patent
Hill

(10) Patent No.: US 7,873,652 B1
(45) Date of Patent: *Jan. 18, 2011

(54) ELECTRONIC PRESENTATION GENERATION SYSTEM AND METHOD

(75) Inventor: Charles E. Hill, Ansonia, OH (US)

(73) Assignee: Charles E. Hill & Associates, Inc., Jefferson, TX (US)

(*) Notice: Subject to any disclaimer, the term of this patent is extended or adjusted under 35 U.S.C. 154(b) by 847 days.

This patent is subject to a terminal disclaimer.

(21) Appl. No.: 11/219,403

(22) Filed: Sep. 2, 2005

Related U.S. Application Data

(63) Continuation of application No. 09/652,173, filed on Aug. 31, 2000, now Pat. No. 7,058,647.

(60) Provisional application No. 60/157,501, filed on Oct. 4, 1999, provisional application No. 60/151,552, filed on Aug. 31, 1999.

(51) Int. Cl.
G06F 17/30 (2006.01)
(52) U.S. Cl. .................................. 707/769; 707/770
(58) Field of Classification Search .................. None
See application file for complete search history.

(56) References Cited

U.S. PATENT DOCUMENTS

| | | |
|---|---|---|
| 3,892,053 A | 7/1975 | Booher |
| 5,416,900 A | 5/1995 | Blanchard et al. |
| 5,452,416 A | 9/1995 | Hilton et al. |
| 5,517,605 A | 5/1996 | Wolf |
| 5,528,490 A | 6/1996 | Hill |
| 5,623,681 A | 4/1997 | Rivette et al. |
| 5,712,995 A | 1/1998 | Cohn |
| 5,748,931 A | 5/1998 | Jones et al. |
| 5,838,316 A | 11/1998 | Arruza |
| 5,845,288 A | 12/1998 | Syeda-Mahmood |
| 5,850,552 A | 12/1998 | Odani et al. |
| 5,870,725 A | 2/1999 | Bellinger et al. |
| 5,877,961 A | 3/1999 | Moore |
| 5,895,455 A | 4/1999 | Bellinger et al. |
| 5,917,480 A | 6/1999 | Tafoya et al. |
| 5,920,315 A | 7/1999 | Santos-Gomez |
| 5,933,546 A | 8/1999 | Stone |
| 5,946,417 A | 8/1999 | Bonneau et al. |
| 5,960,448 A | 9/1999 | Reichek et al. |
| 5,970,471 A | 10/1999 | Hill |
| 5,978,804 A | 11/1999 | Dietzman |
| 6,008,807 A | 12/1999 | Bretschneider et al. |
| 6,012,071 A | 1/2000 | Krishna et al. |
| 6,035,323 A | 3/2000 | Narayen et al. |
| 6,041,143 A | 3/2000 | Chui et al. |
| 6,070,167 A | 5/2000 | Qian et al. |
| 6,112,202 A * | 8/2000 | Kleinberg .................. 707/5 |
| 6,128,629 A | 10/2000 | Bretschneider et al. |

(Continued)

OTHER PUBLICATIONS

"Presenter's Guide for Auditoriums", Jul. 1, 1999, PlaceWare Conference Center.

*Primary Examiner*—Baoquoc To
(74) *Attorney, Agent, or Firm*—Baker & Daniels LLP

(57) ABSTRACT

A method of presenting electronic data includes associating presentation data with data from which the presentation data was selected. The presentation data is associated with the data to permit searching of the presentation data and the data from which the presentation data was selected.

24 Claims, 22 Drawing Sheets

U.S. PATENT DOCUMENTS

| | | |
|---|---|---|
| 6,173,338 B1 | 1/2001 | Fukuta |
| 6,240,414 B1 | 5/2001 | Beizer et al. |
| 6,246,797 B1 | 6/2001 | Castor et al. |
| 6,298,173 B1 | 10/2001 | Lopresti |
| 6,317,141 B1 | 11/2001 | Pavley et al. |
| 6,396,500 B1 * | 5/2002 | Qureshi et al. .............. 345/473 |
| 6,404,441 B1 | 6/2002 | Chailleux |
| 6,408,301 B1 | 6/2002 | Patton et al. |
| 6,415,282 B1 * | 7/2002 | Mukherjea et al. ............. 707/3 |
| 6,430,624 B1 | 8/2002 | Jamtgaard et al. |
| 6,445,834 B1 | 9/2002 | Rising, III |
| 6,551,357 B1 | 4/2003 | Madduri |
| 6,611,291 B1 | 8/2003 | Dow et al. |
| RE38,284 E * | 10/2003 | Allen et al. ................. 715/273 |
| 2001/0047373 A1 | 11/2001 | Jones et al. |

* cited by examiner

ELECTRONIC PRESENTATION GENERATION SYSTEM AND METHOD

RELATED APPLICATIONS

This application is a continuation of U.S. application Ser. No. 09/652,173, filed on Aug. 31, 2000 now U.S. Pat. No. 7,058,647, which claims the benefit of U.S. Provisional Application No. 60/151,552, filed Aug. 31, 1999, and U.S. Provisional Application No. 60/157,501, filed Oct. 4, 1999, the disclosures of which are incorporated herein by reference.

BACKGROUND AND SUMMARY OF THE INVENTION

The present invention relates to an information management system, and, more particularly, an information management system for generating electronic presentations.

Commercial electronic presentation tools have been around for several years. Examples of these tools are Microsoft's PowerPoint and Software Graphics Corporation's Harvard Graphics. These existing electronic presentation tools simply replace the original slide projector and set of notes with the computer and its associated monitor. They have the advantage that once the presentation is created, it can be modified easily to be used again. However, the work required to generate the initial presentation is tedious and time consuming, and not unlike creating a presentation using slides and notes.

Standard presentation systems such as Microsoft's PowerPoint allow the user to select background onto which images and text are added. The presentation itself contains no intelligence other than the title and the subdirectory in which the presentation is stored. Therefore the user at a later date would have no means of determining the contents other than to select presentations whose titles and/or storage location might suggest contents of interest. No intelligence is stored with the individually created slides on which to query. Therefore, once a presentation has been selected whose title and/or location suggest it may have contents of interest to the user, the entire contents of the presentation must be manually examined by the user to determine if there are any slides of interest.

There are systems to catalog text and images in databases. Some systems place the image into the text database in a special field called a "blob." Blobs are fields within a database in which binary data may be stored. The blob field is available in SQL databases. This system allows a user to search the text database for information defining the stored image in the blob field and upon a successful find, extract the image. Other systems use a standard text field to point to the location of the image file.

Other systems exist for organizing photographs in digital format. These systems simply mimic the common photo album by allowing the user to select borders, album layout, and add captions. These systems, however, do not catalog individual photographs to aid in later selection for purposes of creating a special presentation.

All of the above generic presentation systems have the disadvantage of an inability to preserve any intelligence associated with the information being inserted. As a result, there is no way to search past presentations for slides that may be applicable to a new presentation being developed.

Another disadvantage of the above generic presentation systems is their inability to catalog graphical slide information as it is being prepared. In the preparation of a slide, the graphics are many times a combination of one or more graphics or the modification of existing graphics. As graphical information is merely inserted into these generic presentation systems and not cataloged, there is no method to efficiently retrieve the graphical information later. Users simply must sort through numerous slides in an inefficient search for data. This inefficiency is further exacerbated when the presentations a user searches were not authored by that user, and thus the user is unfamiliar with the presentation content, and requires more time to search.

The present invention relates to the cataloging of images and text, thus providing each image with intelligence. A query can then be generated, allowing only the selection of those images of interest. The user can then select from this subset of presentation images for a new presentation. This presentation set of images with their respective data may then be used without modification as a multimedia presentation or modified to create a unique multimedia presentation of images with or without text descriptions. The collection of images may also be packaged for distribution to a third party for incorporation into a publication, or for importation into a third party presentation package.

Throughout this specification, the present invention will be described in connection with the cataloging of museum images and associated text, and generating presentations from this cataloged data. It is understood, however, that the apparatus and method of the present invention may be used with any type of product or subject matter, e.g., for creating and storing sales presentations for industrial products such as machine parts. Therefore, the example of museum subject matter is for illustrative purposes only and is not intended to limit the scope of the present invention.

According to the invention, the generation of presentations from large data sets is greatly simplified. Intelligent queries of existing databases as well as previously generated presentations allow the user to select a subset of slides from which to build a new presentation or modify an existing presentation.

Personnel at museums are required to give numerous presentations to various groups. These presentations may be educational, e.g., for the benefit of students, or may be institutional, e.g., for the benefit of a board to trustees. Still others are given to make the public aware of specific exhibits currently on display at the museum. And of course, many are given to potential contributors to solicit financial aid to support the museum, its functions, and to add to its collection.

Because of the wide range of audiences and lecture material, there is a constant requirement for new lectures which in turn require new presentations. Museum inventory or pieces are often contained in a collection card file. At the present time, when creating a new presentation, the user must first search the collection card file, select those items that might be useful in a presentation, find a slide of the item if available, and then manually develop a slide based presentation.

Even if the collection card file is in electronic format, the user must manually extract any pertinent data for insertion into the presentation. If the presentation is to be generated on one of the commercially available presentation packages referenced earlier, the text information from the card collection data must be formatted and typed into the system. Any related graphics must then be found as a file name on the system network and inserted into the appropriate screen area. Once the text and graphics data are inserted into the slide, all links to their origin are lost. As a consequence, should the user realize during the generation of a subsequent presentation that a previously developed slide in a previous presentation would be useful, there is no easy method of finding the original information related to the selected slide unless the user recognizes the source. This inefficiency is increased as the volume of card collection data increases, and as the number of stored presentations increases.

Additionally, a museum will often have non-collection data stored. This non-collection data may range from a picture of the location where the collection piece is stored, photographs and biographies of trustee members, pictures and data regarding special events such as fund raisers, etc. This non-collection data is not easily cataloged in a collection card file, and thus, should a user desire to include this data in a presentation, the user must search records that are often not linked or categorized in any meaningful manner. This unstructured search requires great time and effort.

In the system of the present invention, collection data and non-collection data, including graphics data and textual data, and the presentation data are all intelligently linked together. Collection data, although not exactly the same for each museum, is very similar. Collection data and software to electronically file this data is well defined and available from multiple sources. Cataloging museum pieces is less well defined but would include graphics data such as pictures of the piece, pictures of the piece location in the museum, and, perhaps, a picture of the author. In both of these existing systems, an accession number is a key index.

To effectively use these data sources, it is necessary to implement intelligent queries to enable a user to quickly locate objects of interest. Once an object of interest is located, the system of the present invention automatically inserts the object into the presentation that is being generated.

Therefore, in accordance with the invention, a method of cataloging and presenting electronic data is provided. The method includes the steps of storing text data in a first database; storing graphical data in a second database; searching the text data in the first database and the graphical data in the second database to generate a first subset of data; selecting from the subset of data presentation data; intelligently linking the presentation data to the first and second databases; and storing the presentation data in a third database.

Also in accordance with the invention, a further method includes the steps of storing cataloged data in a first database; searching the cataloged data in the first database to generate a subset of cataloged data; selecting from the subset of cataloged data presentation data; intelligently linking the presentation data with the first database; and storing the presentation data in a second database.

Further in accordance with the invention, a computer system for generating electronic presentations is provided. The system includes means for storing text data in a first database; means for storing graphical data in a second database; means for searching the text data in the first database and the graphical data in the second database to generate a first subset of data; means for selecting from the subset of data presentation data; means for intelligently linking the presentation data to the first and second databases; and means for storing the presentation data in a third database.

Also in accordance with the invention, a method for cataloging and presenting collection and non-collection data is provided. The method includes the steps of storing collection data in a collection database; storing presentation data in a presentation database; searching the collection data in the collection database and the presentation data in the presentation database to generate a subset of data; selecting from the subset of data presentation data; intelligently linking the presentation data to the collection database; and storing the presentation data in the presentation database.

Additional objects, features, and advantages of the invention will become apparent to those skilled in the art upon consideration of the following detailed description of the preferred embodiment exemplifying the best mode of carrying out the invention as presently perceived. In an exemplary embodiment of the present disclosure, a computer readable medium is provided. The computer readable medium comprising instructions which when executed by a processor enable a method of presenting electronic data comprising the steps of receiving a search request including a search criteria; identifying based on the search criteria a first subset of data; presenting the first subset of data; receiving a selection of presentation data from the first subset of data for inclusion in a presentation; and associating the presentation data with the respective data in the first subset that the presentation data was selected from to permit searching of the presentation data such that a subsequent search based on the search criteria locates the first subset of data and the presentation data.

BRIEF DESCRIPTION OF THE DRAWINGS

The detailed description particularly refers to the accompanying figures in which.

DETAILED DESCRIPTION OF THE DRAWINGS

Figure 1:
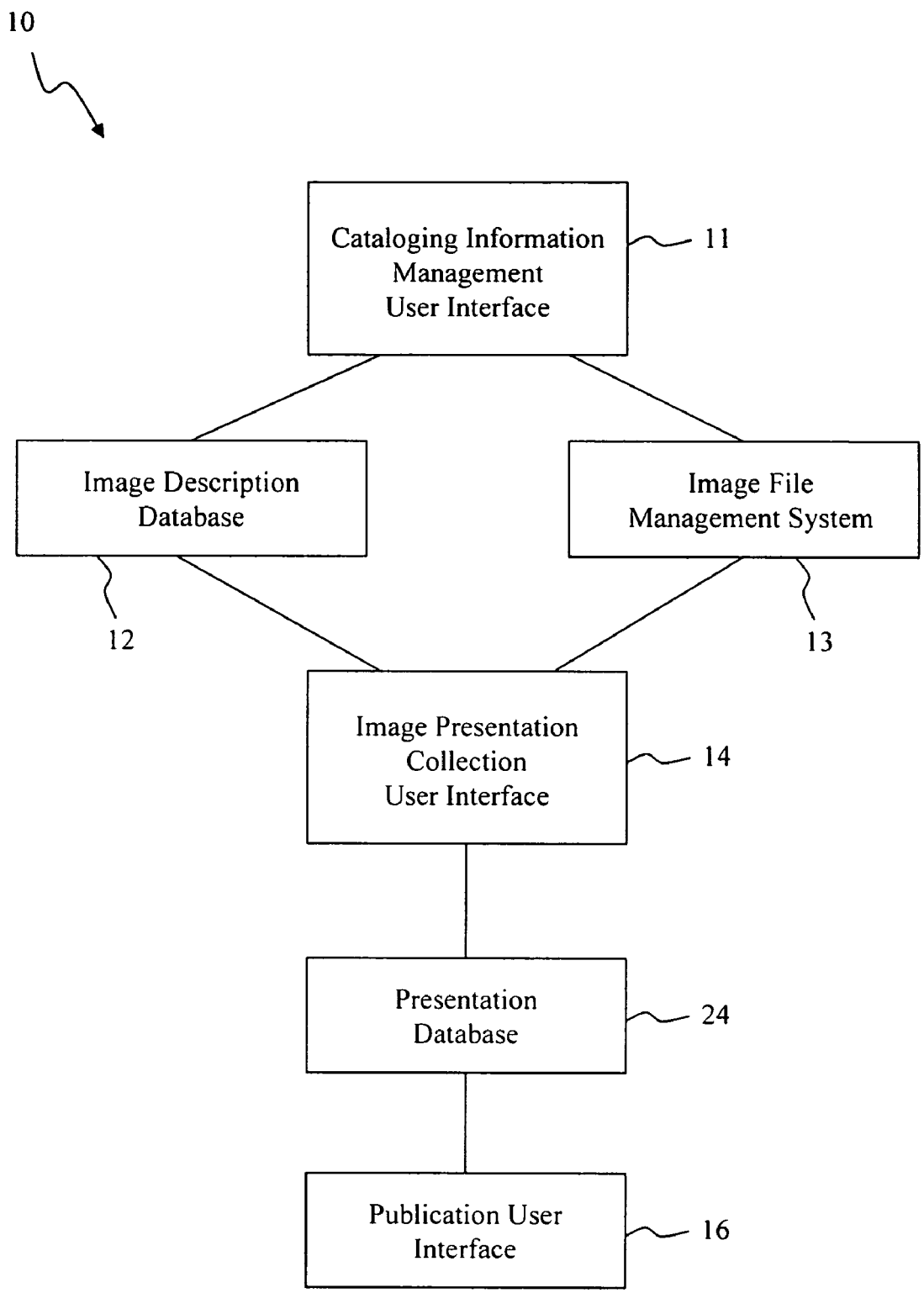
FIG. 1 is a block diagram of an image cataloging and presentation system in accordance with the present invention.

Referring now to the drawings, a block diagram of an electronic presentation generation system 10 in accordance with the present invention is shown in FIG. 1. The system consists of a cataloging information management user interface 11, an image description database 12, an image file management system 13, an image presentation collection user interface 14, a presentation database 24, and a publication user interface 16.

As illustrated in FIG. 1, the image description database 12 and the image file management system 13 are created and maintained by the cataloging information management user interface 11. The image description database 12 can be any known database. The image file management system 13 can be any file management system providing access to images. For example, the image file management system 13 can be a database that supports "blobs"; or a text field of a database containing the location and filename of a digital image; or a hashing routine in which all digital image files are named with a number and the image file management system 13 uses a hashing routine to determine the digital image file location. A hashing routine is especially attractive since the intelligence associated with the image is contained within the image description database 12 and therefore the file name has no significance in defining the image.

For each image cataloged there may be a corresponding text description. This text description is stored in one or more fields in a database, and may be input into the database before, after, or contemporaneously with the image storing process.

An image presentation collection user interface 14 is provided to allow the user to query one or more image description databases 12 for images most likely to meet a current interest. The user would first create a record in the presentation database 24 describing the current presentation. This description could include such information as author, type, description, user name, etc. The user would then select this presentation for editing. In the edit mode, the user can search one or more image description databases 12 or previously generated presentations for images meeting a current interest. For example, the user might be interested in a certain artist. The user could search the collection database for images and information that is part of the museum's collection, search a non-collection database containing modified images and information of pieces of the museum's collection or images and information not related to any of the museum's collection. Additionally, the user could search other previously generated presentations that contained information about the artist.

Whenever an item is found that the user wishes to have as part of the current presentation being edited, it is simply inserted or appended into the presentation being developed. Once it has been added to the presentation, the text and image may be modified to make it more compatible with the current interest. However, the original data from the image description database 12 is maintained unchanged with each image to preserve data integrity. Thus, no matter what modification is made in a presentation, future users searching for related information will find the item in the image description database 12.

The publication user interface 16 gives the user options for packaging the selected set of images and related data. The user may elect to have the system create a file that can be accessed by multimedia presentation software for presentation to an audience. The presentation could be made by the original user or it could be forwarded to another interested party.

The images can also be packaged with user generated titles for each image for publication purposes. These packaged images can be sent to a publisher for inclusion into a related book, magazine, newsletter, newspaper, or electronic article. Because current presentation software has no intelligent search functions, the packaged images offer these systems a convenient method of assembling images for importation.

Figure 2A:
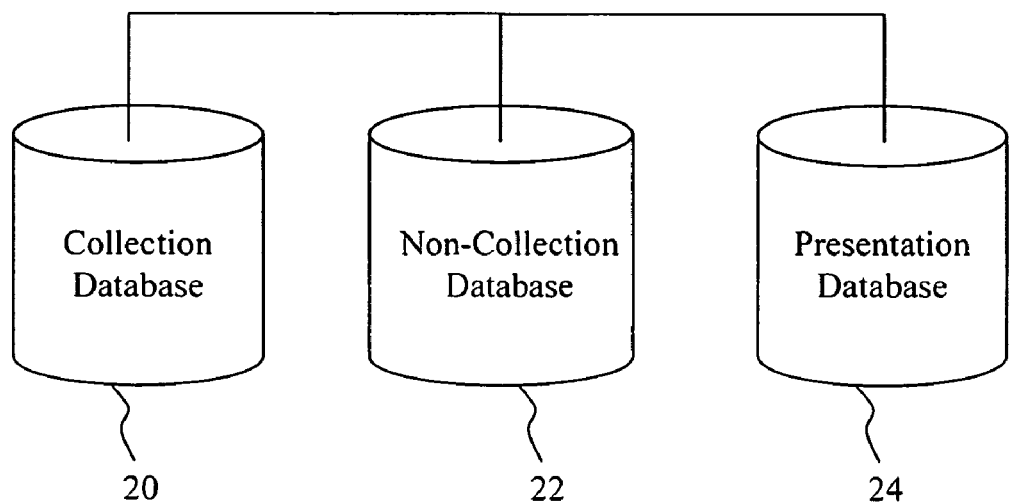
FIG. 2A is a database structure in accordance with an exemplary embodiment of the present invention directed toward the cataloging of museum images and associated text, the database including a collection database, a non-collection database, and a presentation database.
Figure 2B:
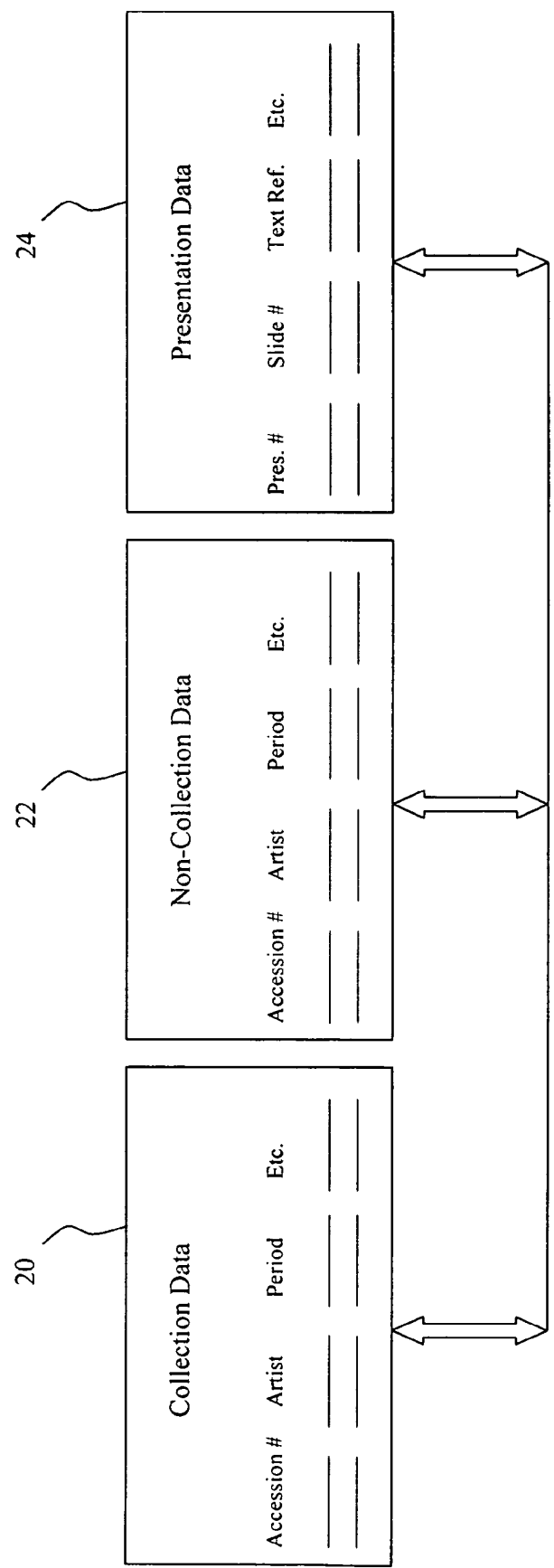
FIG. 2B is an illustrative example of database fields associated with the collection database, non-collection database, and presentation database.

In the exemplary embodiment of the invention provided in this specification, a collection database 20, a non-collection database 22, and a presentation database 24 are provided, as shown in FIG. 2A. Of course, it will be readily apparent to one of ordinary skill in the art that the collection database 20, the non-collection database 22, and the presentation database 24 may all be one database structure, or may be several different databases distributed on one computer or over a distributed network. As previously discussed, the collection database 20 includes information related to museum collection pieces, the non-collection database includes 22 containing modified information regarding museum's collection or information not related to any of the museum's collection, and the presentation database 24 includes information regarding previously generated presentations. These databases are intelligently linked together as shown in FIG. 2B. In the exemplary embodiment of the invention described herein, fields from which an intelligent query can be generated include, but are not necessarily limited to, accession number, artist, period, graphics number, filename, presentation number, slide number, and text reference.

To effectively use these data sources, it is necessary to implement intelligent queries to allow a user to quickly locate objects of interest. Once the objects are located, the user can automatically insert these into the presentation that is presently being generated. In the exemplary embodiment described herein, the following steps are utilized for an intelligent query and generation of a presentation. First, the user conducts an intelligent query of the collection database 20, non-collection database 22, and/or the presentation database 24, which results in a subset of data of interest. The user then displays the text and graphics data of the subset of data of interest, and selects any desired data for insertion into a presentation. Finally, when generation of the presentation is complete, the presentation is stored in a manner that preserves the identity of any graphics or text inserted into the presentation so that future intelligent queries may be conducted on the presentation data.

Because the presentation is stored preserving the identity of the text and graphics, a user will have the ability to search a museum's collection archives for artifacts meeting a certain search criteria, and the ability to search all previously generated presentations for individual slides within those presentations which contain information also meeting those same criteria.

Referring back to the example of a user searching for information regarding a certain artist, the present invention provides the user the capability to search through numerous previously generated presentations efficiently. Because users often name presentations in a manner that does not convey the information contained in the presentation, without this intelligent query capability it is unlikely the user would locate the artist information of interest. Additionally, even if the user knows that an existing presentation might contain useful information, it is laborious to page though each and every slide to locate the information.

The system presently being described not only locates the appropriate slide in an existing presentation, but displays the slide information and allows the user to insert the slide into the new presentation at any location desired. In addition, the information on the slide can be modified to the user's requirements. Once this new presentation is saved, the same original query will indicate two presentations containing similar, but not identical, information, and allow a user to select either or both for yet another presentation.

Of course, instead of using an intelligent query to generate a presentation slide, the user may insert his or her own graphics and text into a slide. Identification data for the user's slide can then be added by the user in the associated data fields in the presentation database 24 so that the user and other users may conduct intelligent queries and thus locate the user's slide for inclusion into future presentations.

The exemplary embodiment of the invention directed toward the cataloging of museum images and associated text, and generating presentations from this cataloged data, will now be discussed. Of course, one skilled in the art will readily appreciate the broader utility of the present invention, and that it is not limited to museum images and associated text. For example, the present invention can be used to access an engine parts supplier inventory and generate intelligent presentations for associated engine parts meeting certain specifications, for example. These presentations could be used to conduct sales efforts, or to assess whether to include other equipment manufacture parts in a user's inventory. Likewise, an engineering firm could use the present invention to inventory its equipment and related equipment information, and generate presentations to assess the state of the art of its equipment. Also, the same invention could be used to catalog images of the engineering firm's projects throughout the world, along with the associated text describing the firm's role in the project, and then be used to generate presentations used to sell the firm's services.

Figure 4:
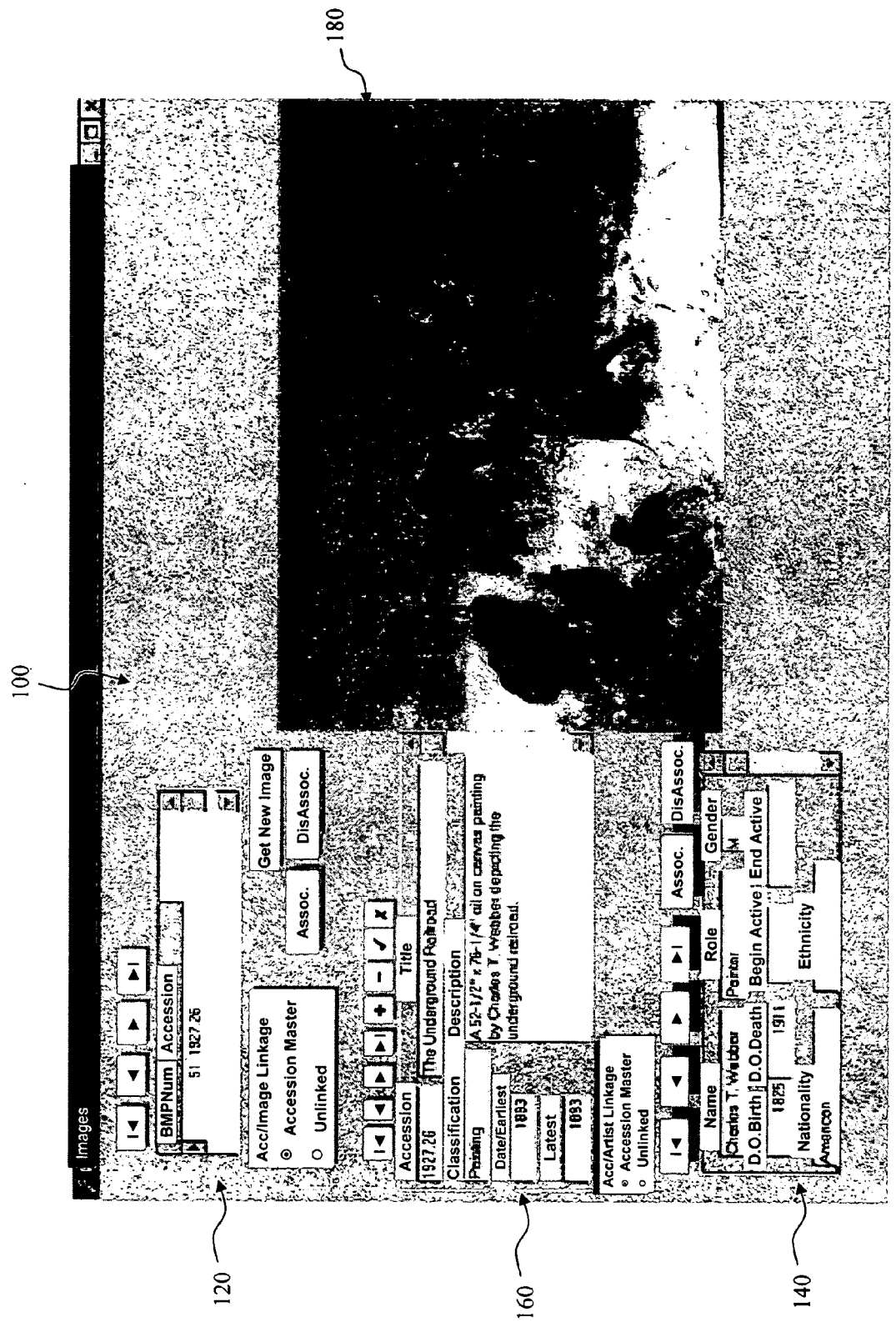
FIG. 4 shows the collection database screen.

FIG. 4 shows the collection database screen 100 associated with the exemplary embodiment of the invention directed toward the cataloging of museum images and associated text, and generating presentations from this cataloged data. There are four subsections in the collection database screen 100: section 120 of the collection database screen 100 provides navigation, editing and association of the graphics database; section 140 of the collection database screen 100 provides navigation, editing and association of an artist database; section 160 of the collection database screen 100 provides editing and navigation functions for the collection database; and section 180 of the collection database screen 100 provides a viewing area of the selected graphics image.

Figure 5:
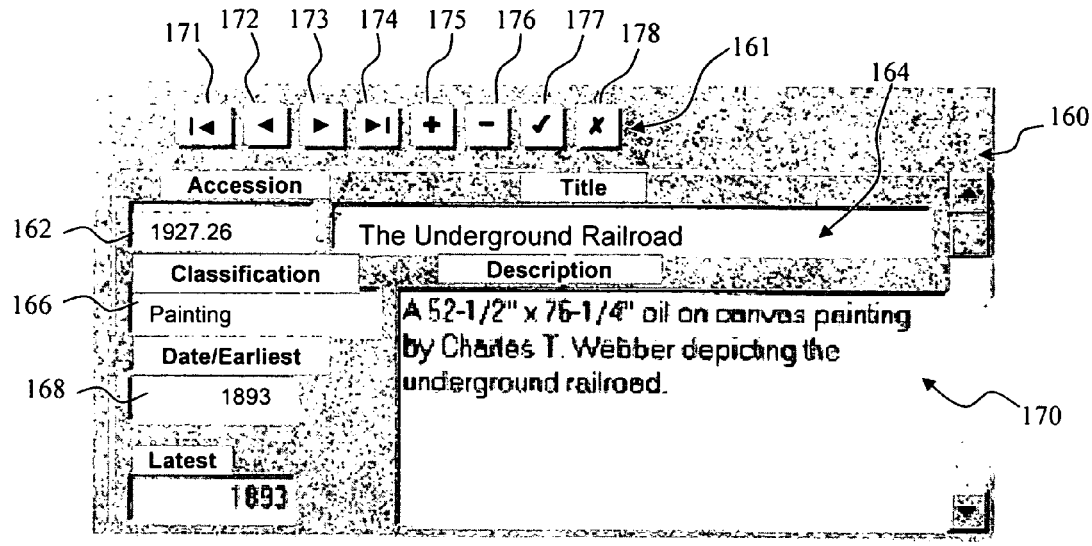
FIG. 5 is a section of the collection database screen that provides editing and navigation functions for the collection database.

Section 160 of the collection database screen is shown in FIG. 5. Navigation bar 161 is a standard navigation feature common in many databases. Button 171 accesses the first record in the database, button 172 access the previous record in the database, button 173 accesses the next record in the database, button 174 access the last record in the database, button 175 opens a new record for adding data to the database, button 176 deletes the current record from the database, button 177 saves edits to the current record, and button 178 refreshes the current record removing any edits. Buttons 171 and 172 are not active as the first record in the collection database 20 is displayed, and buttons 176 and 177, are not active as the record has not been selected for editing.

Data in the collection database 20 is keyed off an accession number in accession field 162. Title field 164 contains the text title associated with the accession number, and description field 170 contains a text description associated with the accession number. Other fields, such as classification 166 and date 168, can also be present in the collection database 20.

Figure 3A:
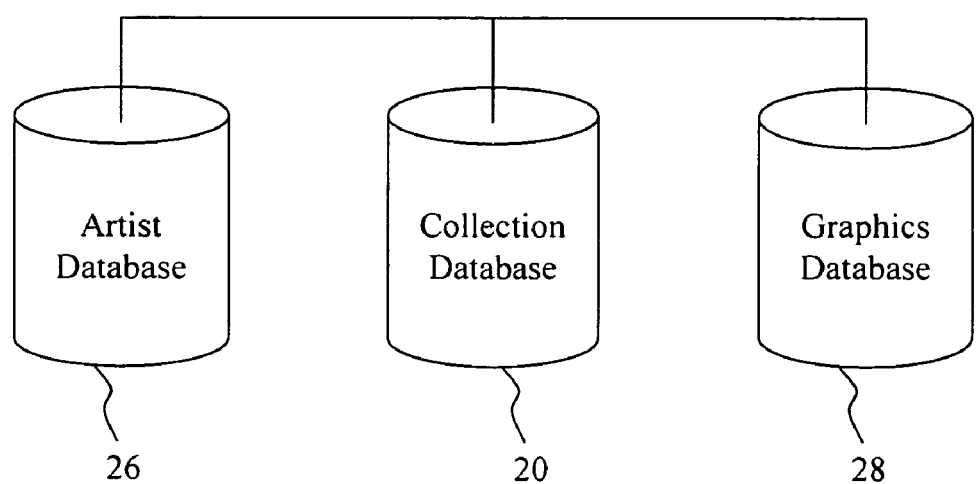
FIG. 3A is another database structure in accordance with the exemplary embodiment of the present invention, the database structure including an artist database and a graphics database.
Figure 6:
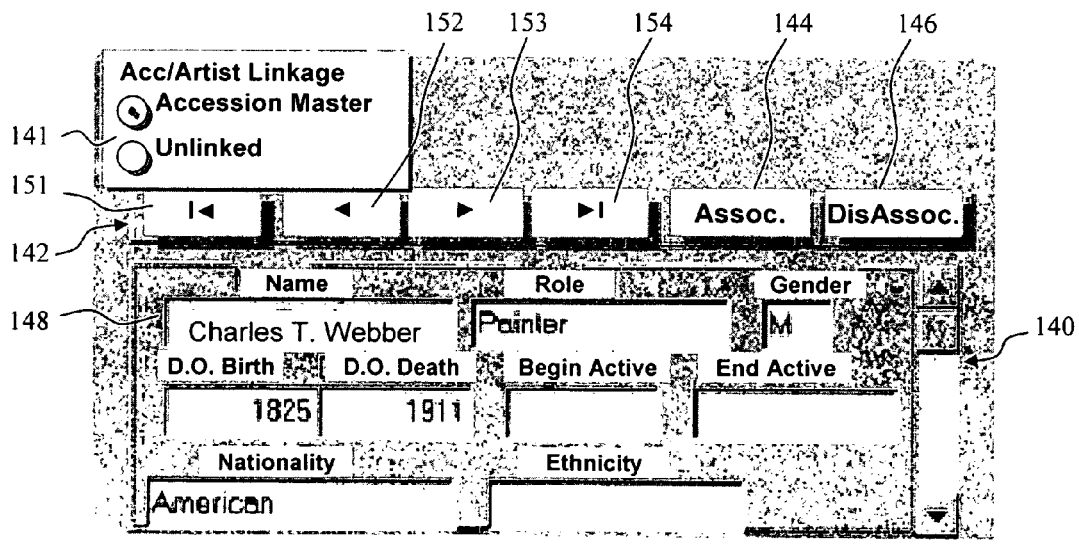
FIG. 6 is a section of the collection database screen that provides navigation, editing and association of an artist database, the screen detail showing an accession master linkage operation mode.

Artists and graphics data are not included in the collection database. As each accession number can be associated with numerous artists and graphics, the association of which is now described with reference to FIGS. 3A, 3B and 6. An unlimited number of artists may be associated with each collection piece. This architecture allows more than one artist to be associated with a specific accession number or collection piece, and thus the user need only maintain the artist information in an artist database 26, as shown in FIG. 3A. FIG. 6 shows section 140 of the collection database screen 100. Section 140 includes an accession/artist linkage toggle box 141, a navigation bar 142, an associate button 144, a disassociate button 146, and name field 148, and other database fields. As shown in FIG. 6, the accession/artist linkage toggle box 141 has been toggled to accession master, causing the records shown in the artist database to be only those that have been associated with the accession number selected in the collection database 20. Thus, as shown in FIGS. 5 and 6, the artist "Charles T. Webber" is associated with accession number 1927.26.

Associate button 144 and disassociate button 146 allow a user to associate or disassociate artists with a specific accession number. When the accession master radio button in accession/artist linkage toggle box 141 has been selected, only associated artists associated to the selected accession number will be displayed. Should a user want to disassociate an artist with an accession number, the user can select the disassociate button 146.

When the accession master radio button in accession/artist linkage toggle box 141 has been selected, only navigation button 151-154 are available. In this mode, button 151 accesses the first artist associated with the selected accession number, button 152 access the previous artist associated with the selected accession number, button 153 accesses the next artist associated with the selected accession number, and button 154 access the last artist associated with the selected accession number.

Figure 7:
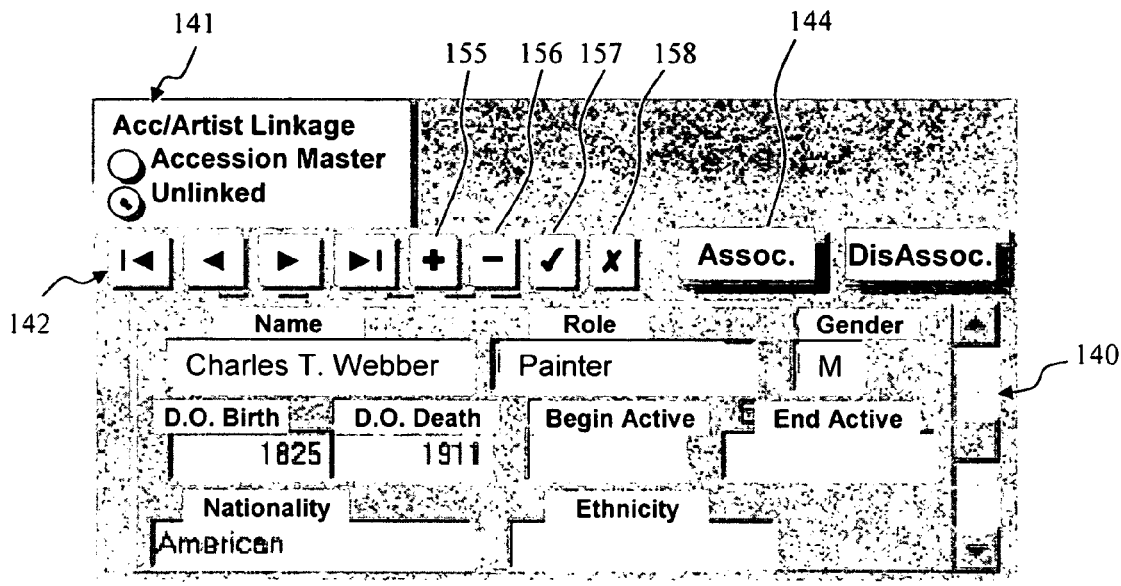
FIG. 7 is a section of the collection database screen that provides navigation, editing and association of the artist database, the screen detail showing an unlinked operation mode.

However, when the unlink radio button in accession/artist linkage toggle box 141 has been selected, the artist database 26 is unlinked from the collection database 20, and the associate button 144 is activated, as shown in FIG. 7. In this mode, navigation buttons 151-158 are available. Button 151 accesses the first artist record in the database, button 152 access the previous artist record in the database, button 153 accesses the next artist record in the database, button 154 access the last artist record in the database, button 155 opens a new artist record for adding data to the database, button 156 deletes the current artist record from the database, button 157 saves edits to the current artist record, and button 158 refreshes the current artist record removing any edits. By unlinking the artist database 26 with the collection database 20, the user is allowed to add, delete and/or edit the artist database 26. Additionally, only the associate button 144 is active, as the user may now select an artist record in the artist database 26 to be associated with an accession number in the collection database 20.

A significant part of the cataloging of a collection database 20 are the images associated with each collection piece and its accession number. Again, as with artists, there will be some pieces that warrant more than one image to visually describe it, such as a sculpture. Therefore, a separate graphics database 28 is maintained, as shown in FIG. 3A. Of course, it will be readily apparent to one of ordinary skill in the art that the collection database 20, the non-collection database 22, the presentation database 24, artists database 26 and graphics database 28 may all be one database structure, or may be several different databases distributed on one computer or over a distributed network.

Figure 8:
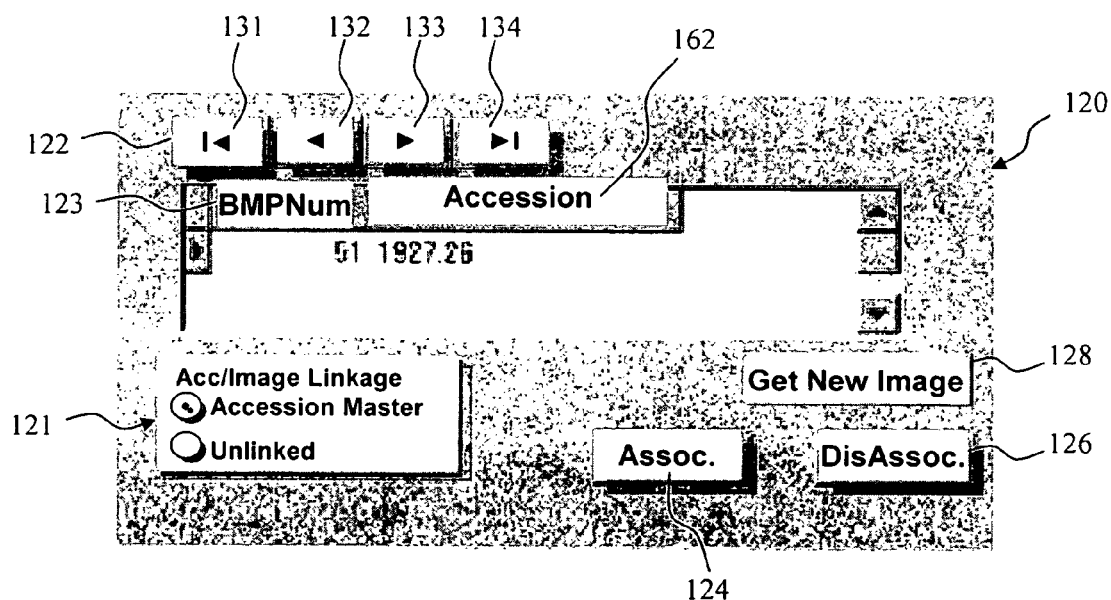
FIG. 8 is a section of the collection database screen that provides navigation, editing and association of the graphics database, the screen detail showing an accession master linkage operation mode.

FIG. 8 shows section 120 of the collection database screen 100. Section 120 includes an accession/image linkage toggle box 121, a navigation bar 122, an associate button 124, a disassociate button 126, and BMP number field 123, and an accession number field 162. As shown in FIG. 8, the accession/image linkage toggle box 121 has been toggled to accession master, causing the records shown in the graphics database to be only those that have been associated with the accession number selected in the collection database 20, e.g., 1927.26. The image file in the BMP number field 123 is displayed in the viewing area section 120 of the collection database screen 100.

Associate button 124 and disassociate button 126 allow a user to associate or disassociate images with a specific accession number. When the accession master radio button in accession/artist linkage toggle box 121 has been selected, only images associated to the selected accession number will be displayed. Should a user want to disassociate an image with an accession number, the user can select the disassociate button 126.

When the accession master radio button in accession/image linkage toggle box 121 has been selected, only navigation button 131-134 are available. In this mode, button 131 accesses the first image associated with the selected accession number, button 132 access the previous image associated with the selected accession number, button 133 accesses the next image associated with the selected accession number, and button 134 access the last image associated with the selected accession number.

Figure 3B:
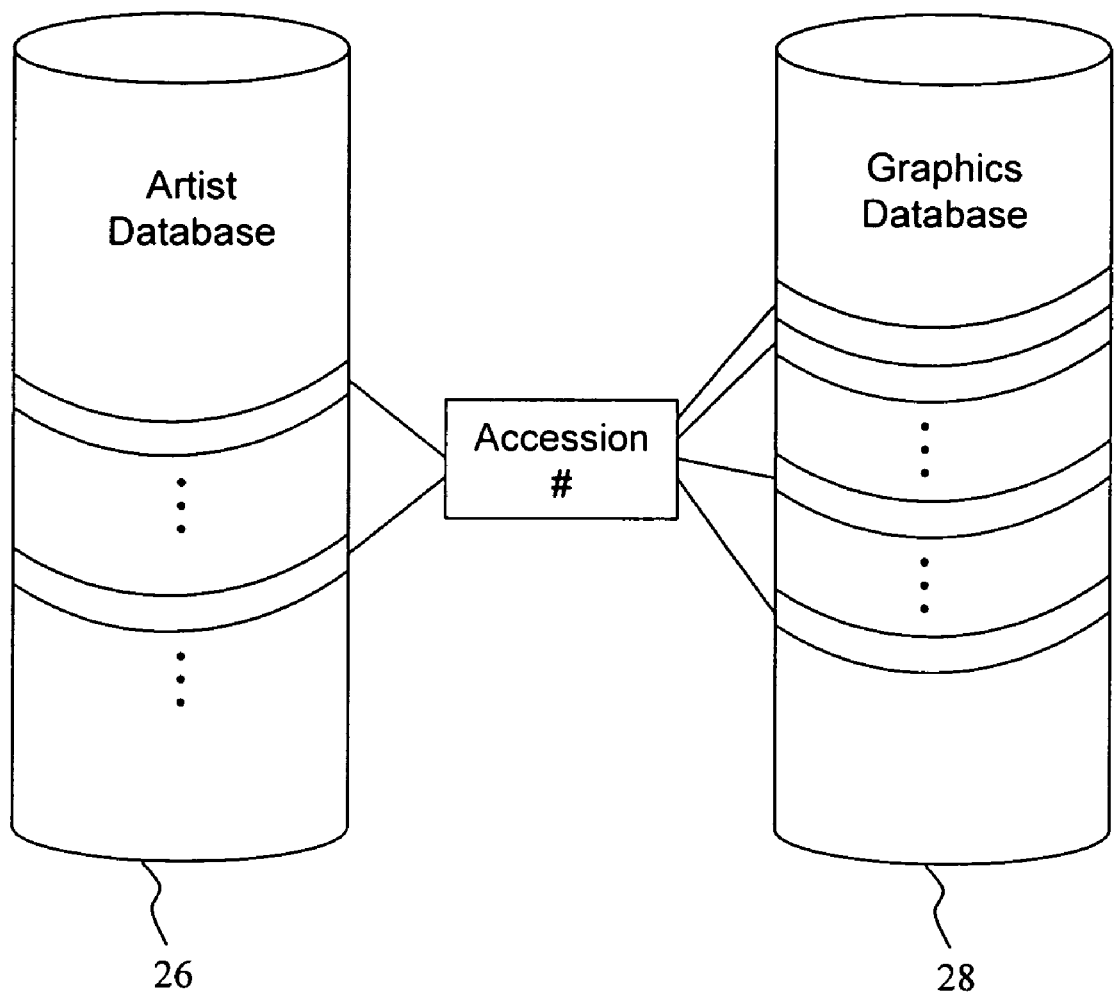
FIG. 3B is an illustrative example of multiple artist database entries and multiple graphics database entries being associated with an accession number.

However, when the unlink radio button in accession/image linkage toggle box 121 has been selected, the graphics database 28 is unlinked from the collection database 20, and the associate button 124 is activated. In this mode, a full set of navigation buttons is available, with functions similar to the navigation button 151-158 as shown in FIG. 7. By unlinking the graphics database 28 with the collection database 20, the user is allowed to add, delete and/or edit the graphics database 28. Additionally, only the associate button 124 is active, as the user may now select a graphics record in the graphic database 28 to be associated with an accession number in the collection database 20. Thus, a single accession number may associated with numerous artists from the artists database 26 and numerous graphics from the graphics database, as shown in FIG. 3B.

Figure 9:
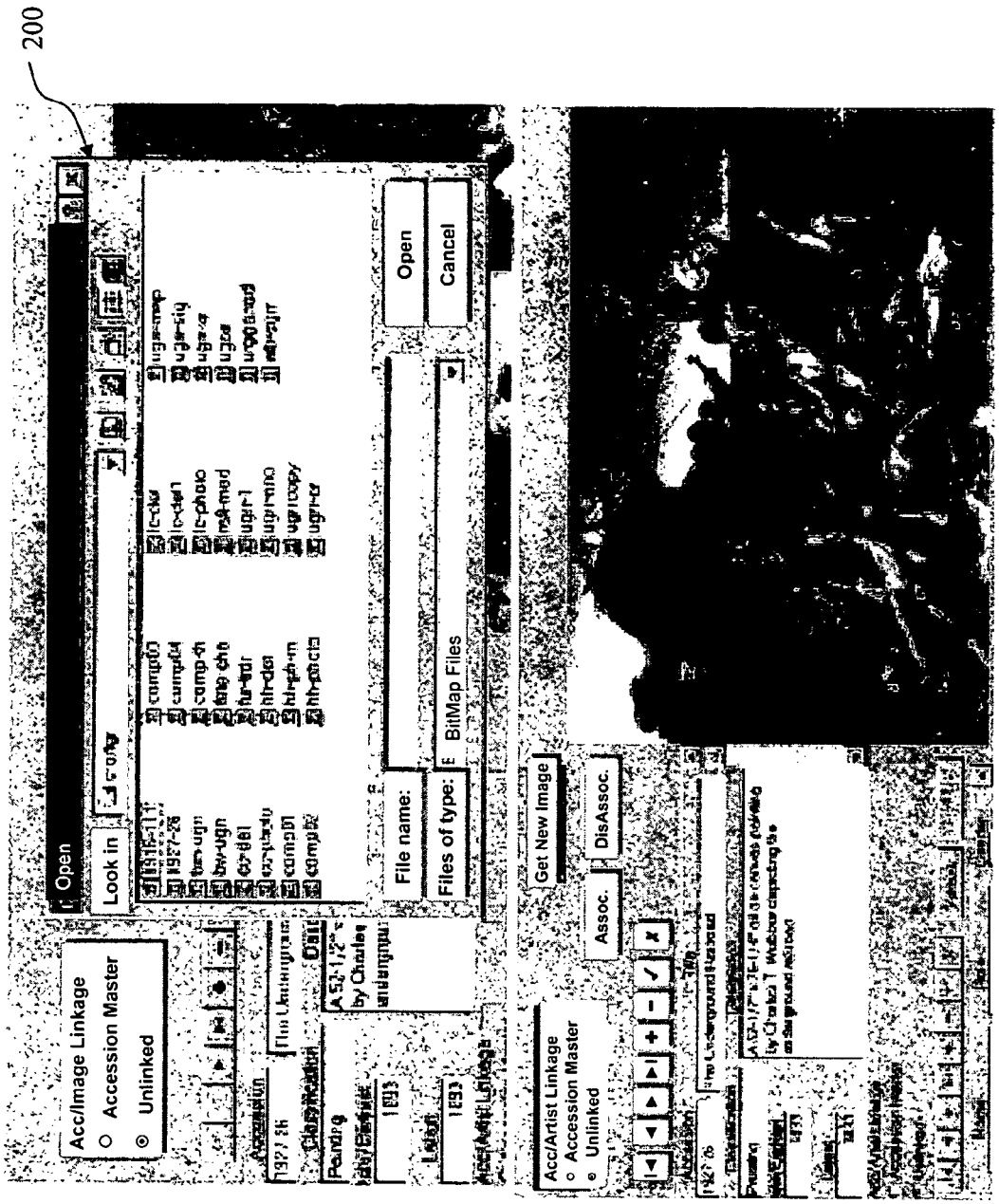
FIG. 9 shows screen display presenting the user selectable image files after a user has activated the "Get New Image" button.

If a user desires to select a new graphics file to be associated with the current accession number in the collection database 20, the user selects the get new image button 128. Selecting the get new image button 128 automatically deselects the accession master radio button in the accession/image linkage toggle box 121 and selects the unlinked radio button. The user is then presented with a browser window 200 to select from a number of available graphics files, as shown in FIG. 9. Once a graphics file is selected, the user must either associate the image to the accession number shown in the current collection database 20, or get another image if the selected image is not desirable, or select the accession master radio button in the accession/image linkage toggle box 121 to relink the collection database with the graphics database. This method allows multiple users to acquire images and store the images without having to be concerned about the image file name or storage location. This is a significant productivity feature as it requires no labor management. In generic presentation systems, a system administrator would be required to assign the name and exact storage location of each image. The system administrator would then be responsible for distributing this information to all the individuals who may be acquiring images. By providing the systems administration management within the software, this problem is eliminated.

Figure 10:
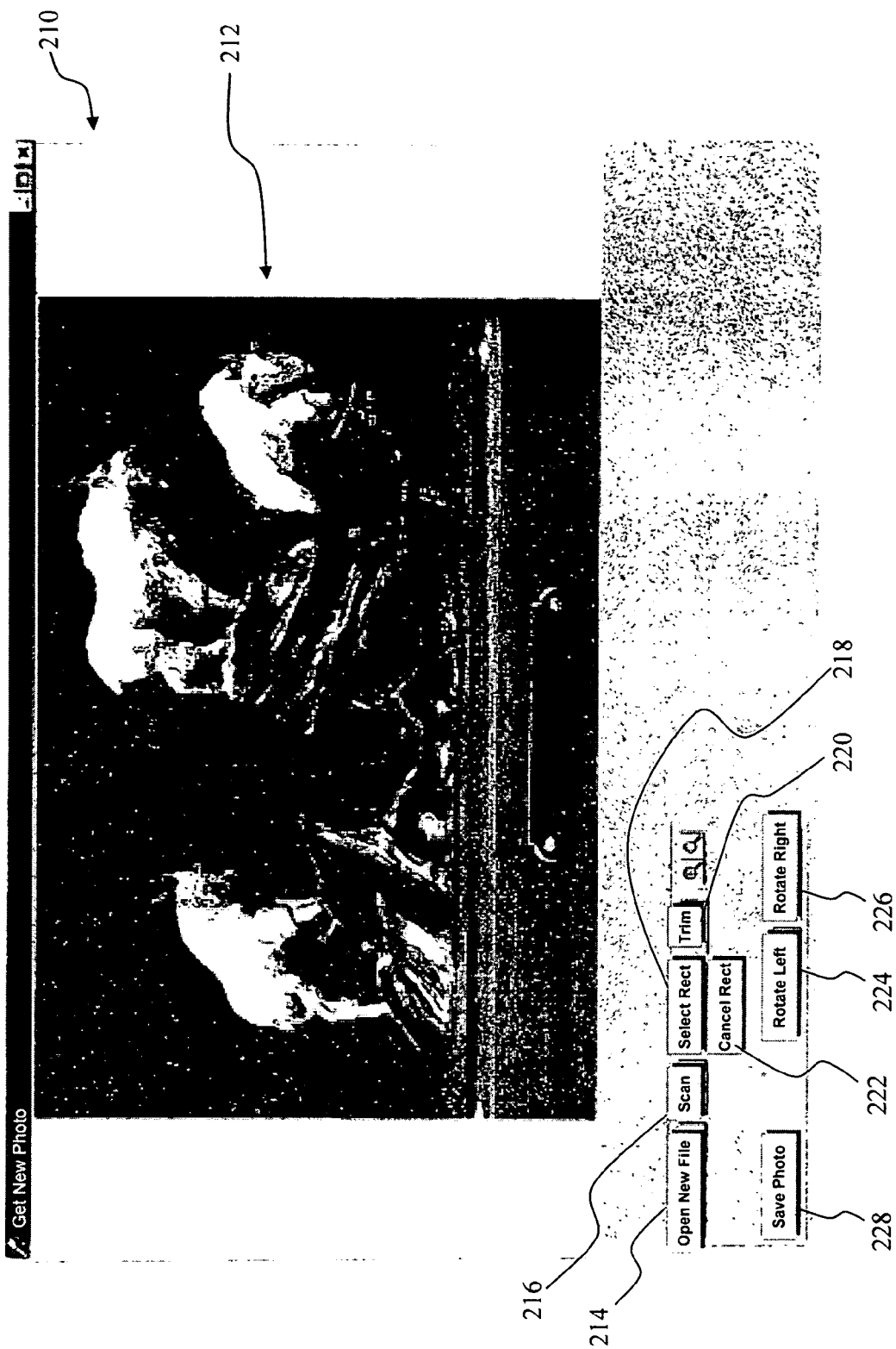
FIG. 10 shows an image selection screen providing the user image selection options for cataloging an image.

In an alternative embodiment, the graphics image may be manipulated or modified before returning to the collection database screen 100. As shown in FIG. 10, an image selection screen 210 providing the user image selection options for cataloging an image 212 appears when the get new image button 128 is selected. Open new file button 214 allows a user to select from existing graphics images. Scan button 216 allows a user to scan in a new image. Select rect button 218, trim button 220, cancel rect button 222, rotate left button 224 and rotate right button 226 are used to crop and select sections of the image 212. Save photo button 228 saves the image. Section 180 of the collection database screen provides a viewing area of the selected graphics image.

Graphics are automatically displayed in landscape or portrait mode depending on the size of the image. For landscape mode the maximum dimensions are 1000 pixels wide×500 pixels high. For portrait mode the maximum dimensions are 577 pixels wide by 632 pixels high. Any graphics with a width dimension greater than 577 pixels is automatically displayed in landscape mode. Graphics files may be in any standard graphics format, such as .jpg, .gif, or .bmp.

Figure 11:
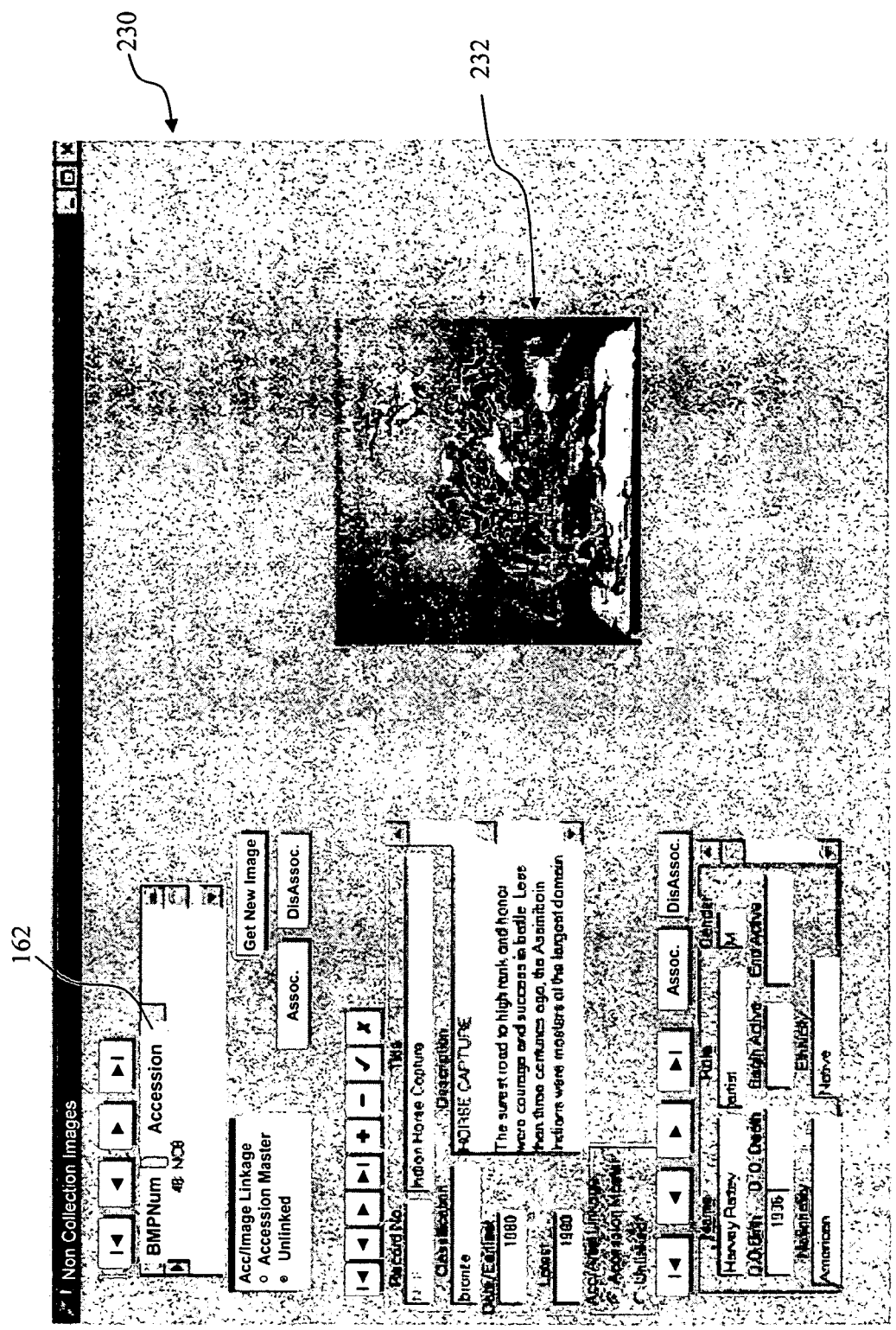
FIG. 11 shows the non-collection database screen.

In the process of building a presentation, there are often slides that have relevance to the collection piece but are not built from collection data. This non-collection data may range from a picture of the location where the collection piece is stored, photographs and biographies of benefactors who have donated pieces, pictures and data regarding special events such as fund raisers, etc. Generic presentation systems offer no method of preserving key information about these slides other than the slide itself within a presentation. The present invention, however, captures this data in a non-collection database 22. For commonality, the non-collection database 22 is almost identical to the collection database 20. The primary difference between the non-collection database 22 and the collection database 20 is the generation of a record number in place of an accession number, as shown in FIG. 11, which shows the non-collection database screen 230 displaying an image 232 of a piece which is not part of a museum's collection. Note that the number in accession field 162 is not in the accession number format, since it is not part of the museum collection and cannot be entered into the collection database. In the non-collection database a record number, in this case NCB, is automatically assigned by the system.

In accordance with the exemplary embodiment of the present invention, a user may query the collection database 20, the non-collection database 22 and the presentation database 24 to build a new presentation. As the number of presentations built increases, the amount of previously generated data in the non-collection database 22 and the presentation database 24 increases accordingly. Thus, the efficiency of generating presentations increases over time.

Figure 12:
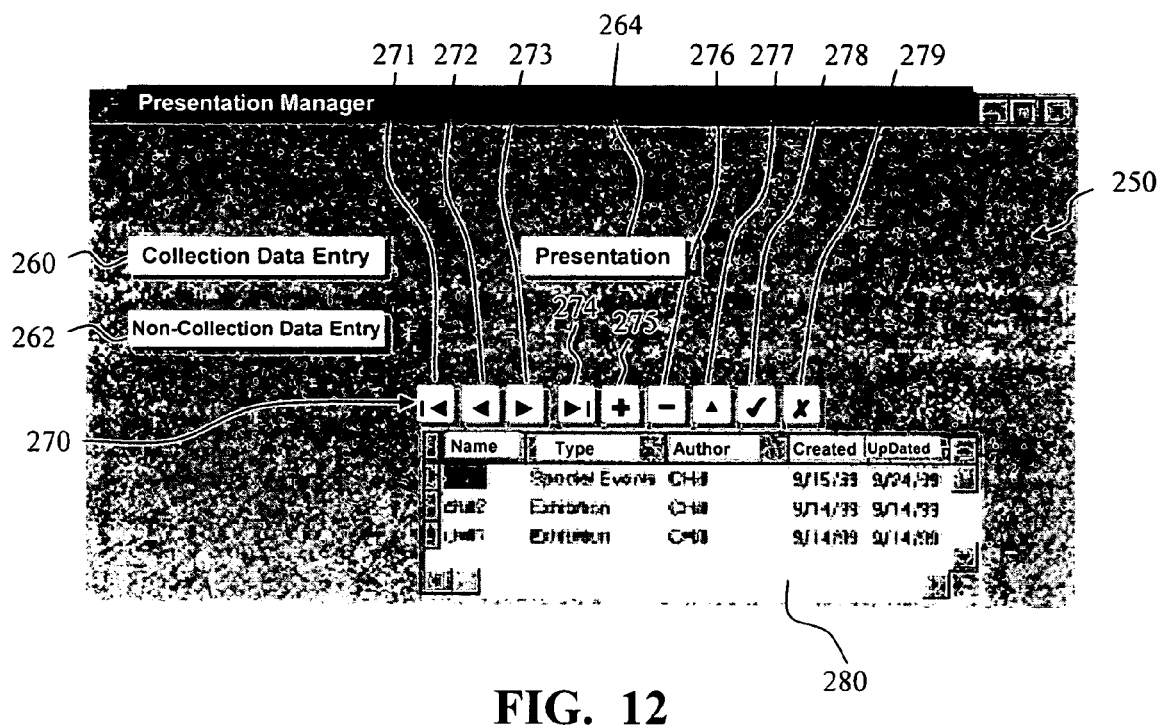
FIG. 12 shows the presentation manager screen that provides presentation building functions.

FIG. 12 shows the presentation manager screen 250 that provides presentation building functions. Collection data entry button 260 selects the collection database 20 for information selection. Non-collection data entry button 262 selects the non-collection database 22 for information selection. Presentation data entry button 264 selects the presentation database 24 for information selection. Navigation bar 270 is a standard navigation feature common in many databases. Button 271 accesses the first presentation stored, button 272 access the previous presentation stored, button 273 accesses the next presentation stored, button 274 access the last presentation stored, button 275 creates a presentation to be stored, button 276 deletes the current presentation, button 277 is an edit record button to select a record, button 278 saves the current presentation, and button 279 refreshes the current presentation removing any edits. Window 280 displays the presentations.

Figure 13:
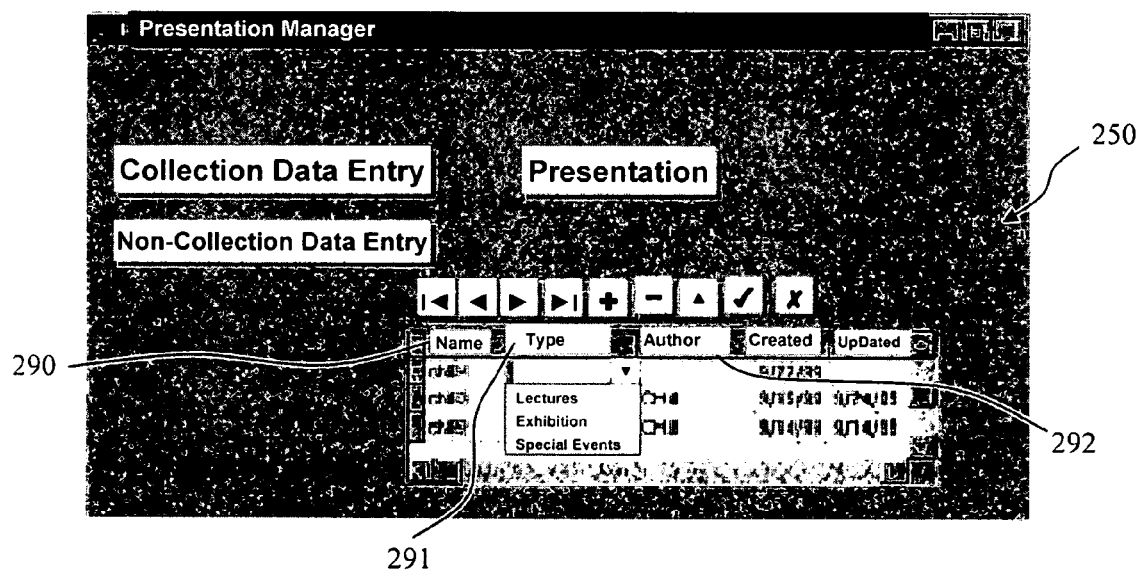
FIG. 13 shows a drop down menu in the presentation manager screen used to select a presentation.

The first step in creating a presentation is to select button 275, and fill in the fields presentation name 290, presentation type 291 and presentation author 292 in the window 280. Other fields are filled in automatically. As shown in FIG. 13, the presentation type field 291 is preferably selected from a drop down menu. The presentation type is determined by the museum. The selection is saved by selecting post edit button 278.

Figure 14:
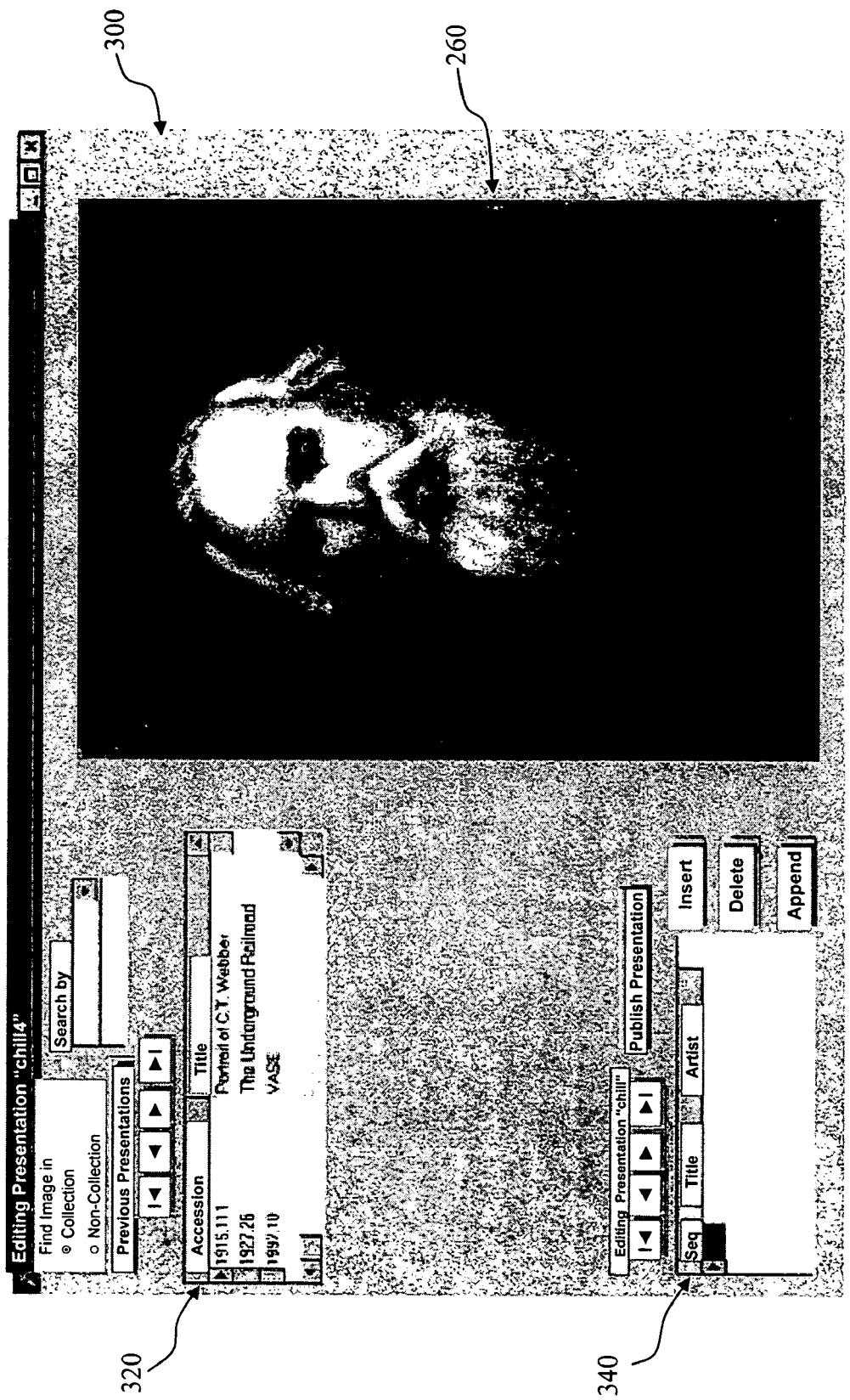
FIG. 14 shows a presentation maintenance screen associated with the presentation manager, the presentation maintenance screen configured to search the collection database.

Once the presentation name 290, presentation type 291 and presentation author 292 fields have been filled in, the presentation is selected by double clicking on its name in the presentation name filed 290. This causes the presentation maintenance screen 300 to appear, as shown in FIG. 14. Presentation maintenance screen 300 includes three sections: section 320 for inputting user-defined searches of either from the collection database 20, non-collection database 22 or presentation database 24 using drop down menu search field; section 340 for screen for adding or deleting slides from the collection database 20, non-collection database 22 or presentation database 24 in a presentation; and section 360 provides a viewing area of the selected graphics image.

Figure 15:
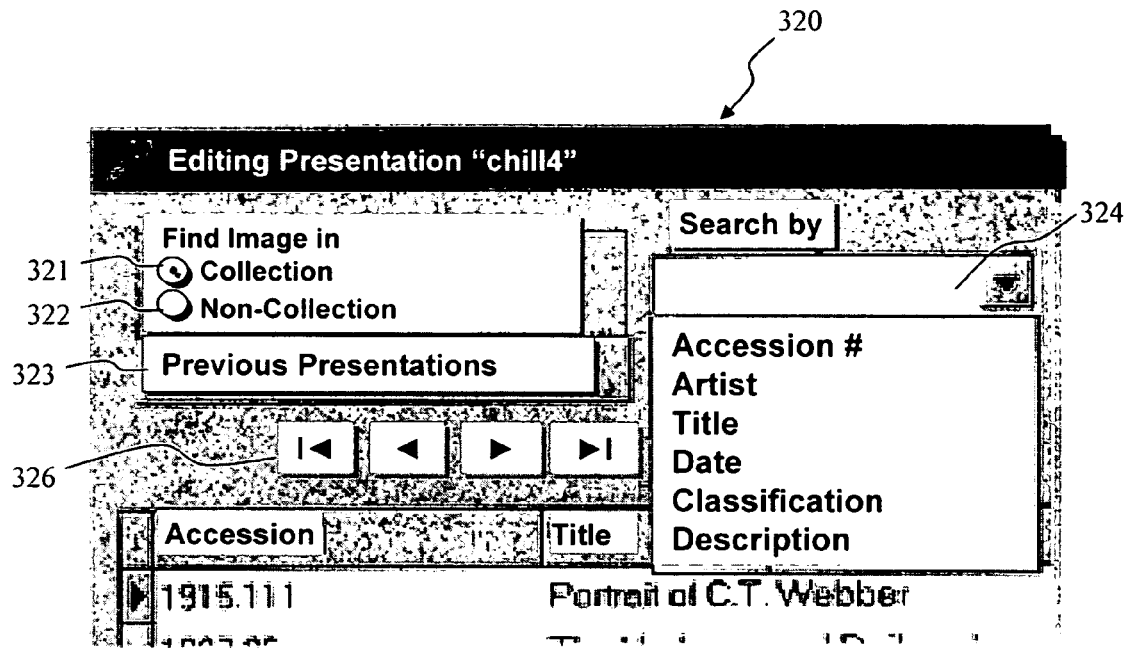
FIG. 15 is a section of the presentation maintenance screen for inputting user-defined searches of either the collection, non-collection or presentation databases using a drop down menu search field.

As shown in FIG. 15, the collection database 20, non-collection database 22 or presentation database 24 may be selected for gathering slide information by collection radio button 321, non-collection radio button 322, and previous presentation button 323, respectively. With the collection radio button 321 selected, the collection database 20 is selected and the first record is displayed. Using a navigation bar 326, the user may manually browse the records in the collection database 20.

Figure 16:
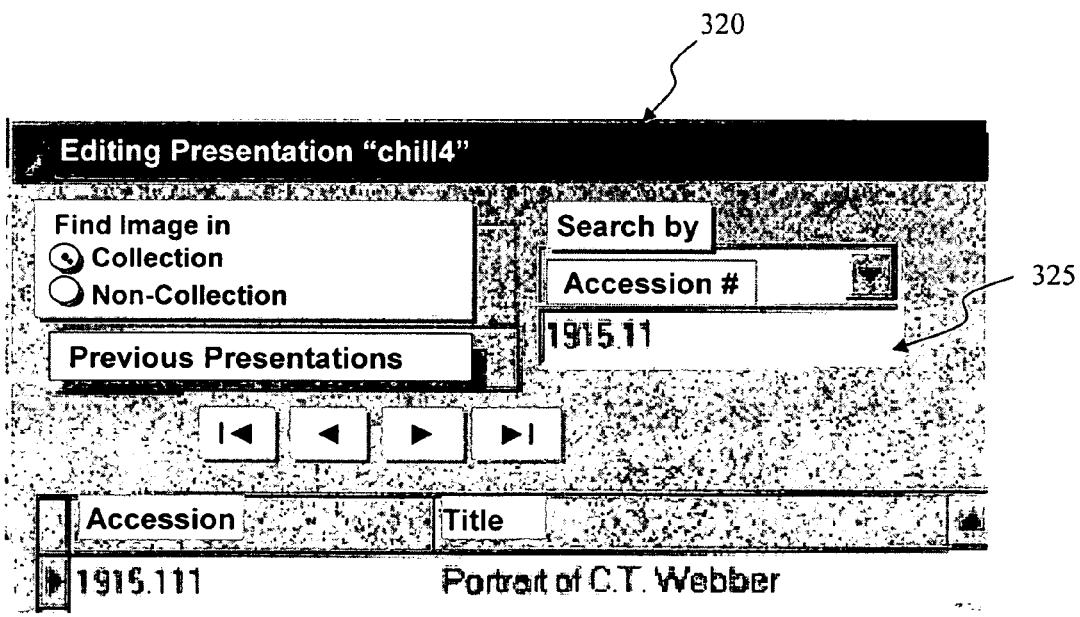
FIG. 16 is an illustrative example of a user-defined search of the collection database by the accession number field.

However, when the collection database comprises thousands of records, a manual search of each record is impractical. Thus, an intelligent search mechanism is provided using search criteria defined by the museum. Drop down menu 324 lists all the search fields for the first search option. As shown in FIG. 16, the user selects the "Accession #" field. In the text box 325 below the drop down menu box 324, the user can type in the entry to search for, e.g., accession number 1915.11. With an accession number, only one record would be provide from a search. However, with another field, such as "Artist," multiple records could be produced from a search query, as an artist may be associated with numerous accession numbers. Multiple collection records are searched by using the navigation bar 326.

Figure 17:
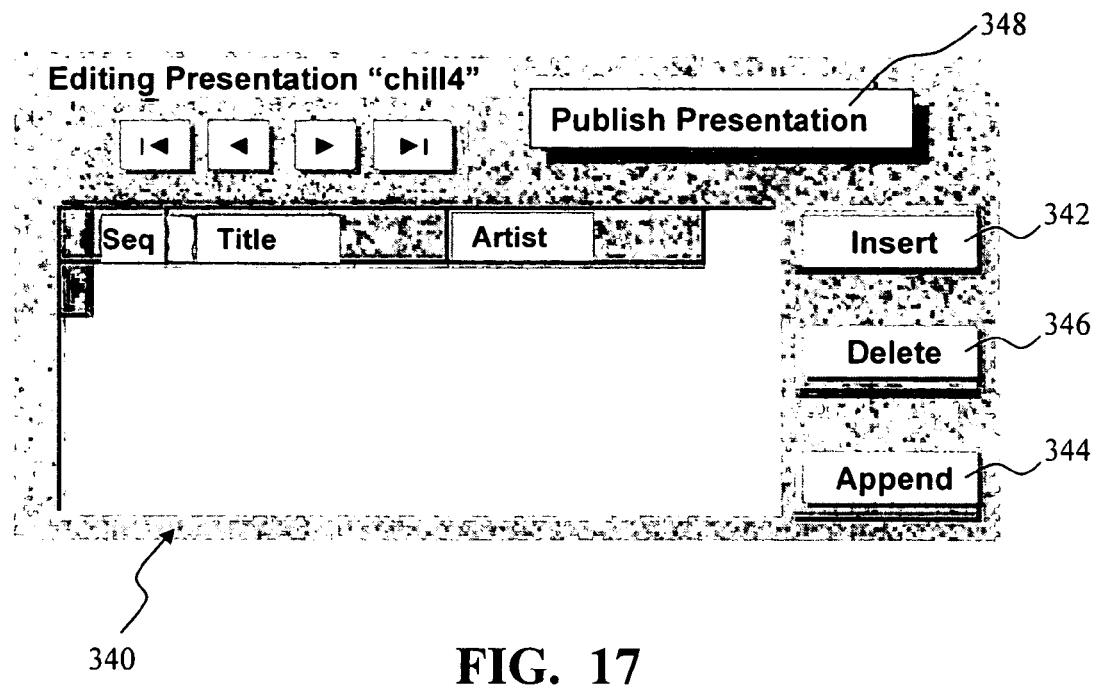
FIG. 17 is a section of the presentation maintenance screen for adding or deleting collection slides from the collection database in a presentation.
Figure 18:
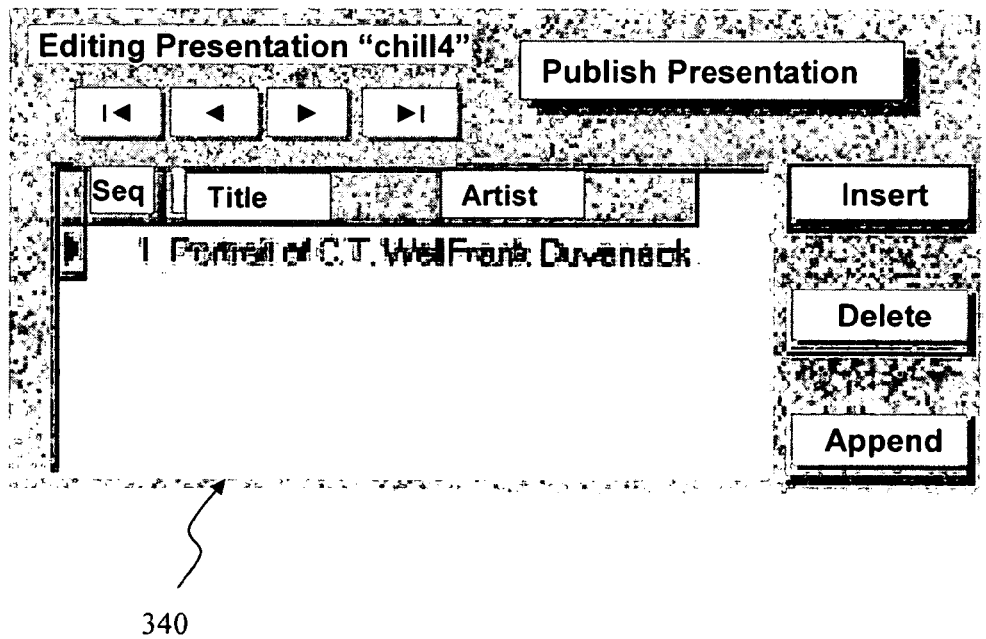
FIG. 18 is an illustrative example of a first slide record in a newly defined presentation, the first slide containing data from the collection database.
Figure 19:
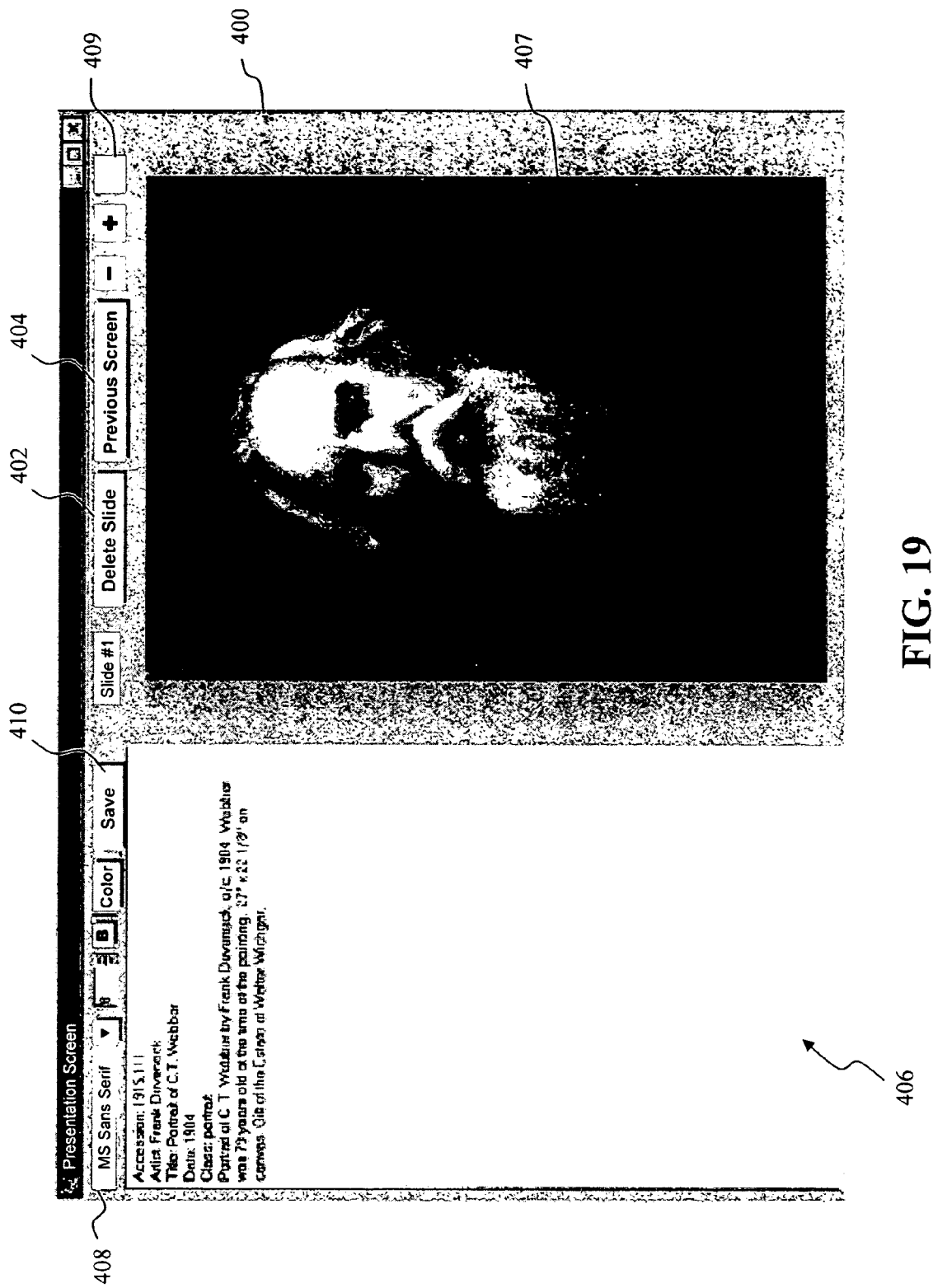
FIG. 19 shows the presentation screen associated with a presentation and displaying data for the first slide.
Figure 20:
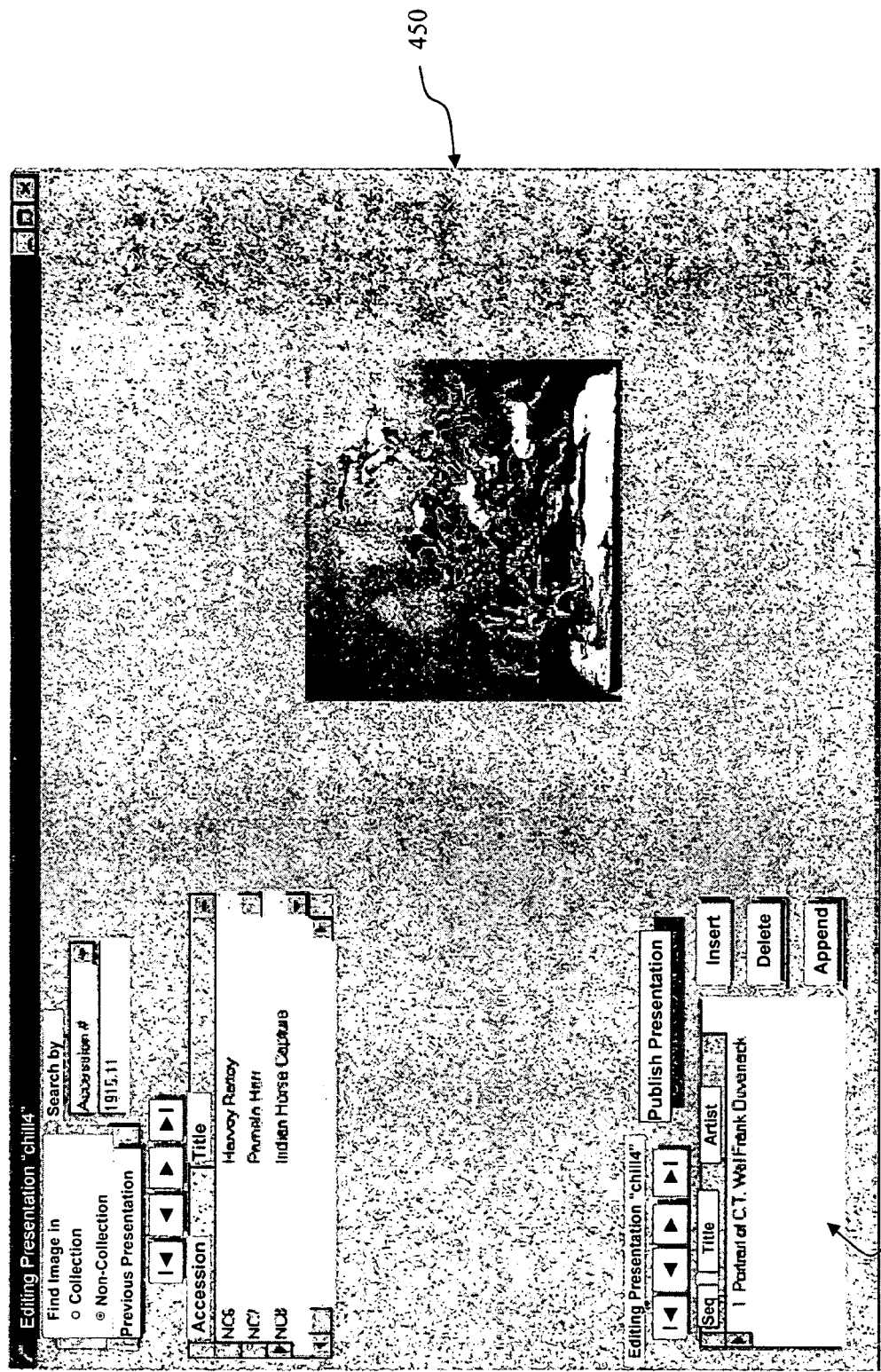
FIG. 20 shows the presentation maintenance screen associated with the presentation manager, the presentation maintenance screen configured to search the non-collection database.

Once a user finds a collection record to be used in a presentation, the user selects either the insert button 342 or the append button 344 in section 340 of the presentation maintenance screen 300, as shown in FIG. 17. The insert button 342 inserts a slide into a presentation after a selected slide, while the append button 344 adds the slide to the end of the presentation list. For the first slide, either button accomplishes the same result, as shown in FIG. 18, in which the first slide record of a presentation is shown. By double clicking on the first slide record, presentation screen 400 associated with a presentation for displaying the slide data appears, as shown in FIG. 19. Delete slide button 402 deletes a slide from the presentation, and previous slide button 404 brings information from a previous slide into the presentation screen 400. Text area 406 contains textual information related to the image displayed in image display area 407. The text may be modified, added to, or deleted, and may be formatted using the menu bar 408 format functions. If it is desired to display the picture only, selecting the picture only button 409 will hide the text and center the image. Once the slide is properly edited, the user selects save button 410 to save the finalized slide for use in a presentation.

As shown in FIG. 19, the system has imported all of the information from the collection database 20 as well as the graphics associated with that record. If the user selects from the non-collection database 22 by selecting non-collection database radio button 322, a presentation maintenance screen 450 associated with the non-collection database would appear. Presentation maintenance screen 450 is similar in all respects to a presentation maintenance screen 300, except that the number in accession field is not in the accession number format, since it is not part of the museum collection and cannot be entered into the collection database 20.

Figure 21:
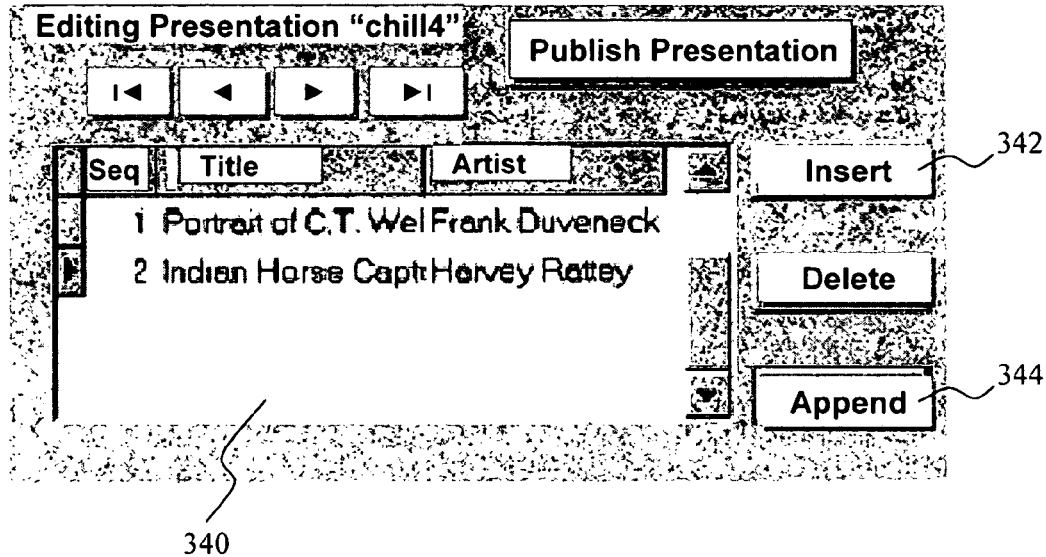
FIG. 21 is an illustrative example of a second slide in a newly defined presentation, the second slide containing data from the non-collection database.
Figure 22:
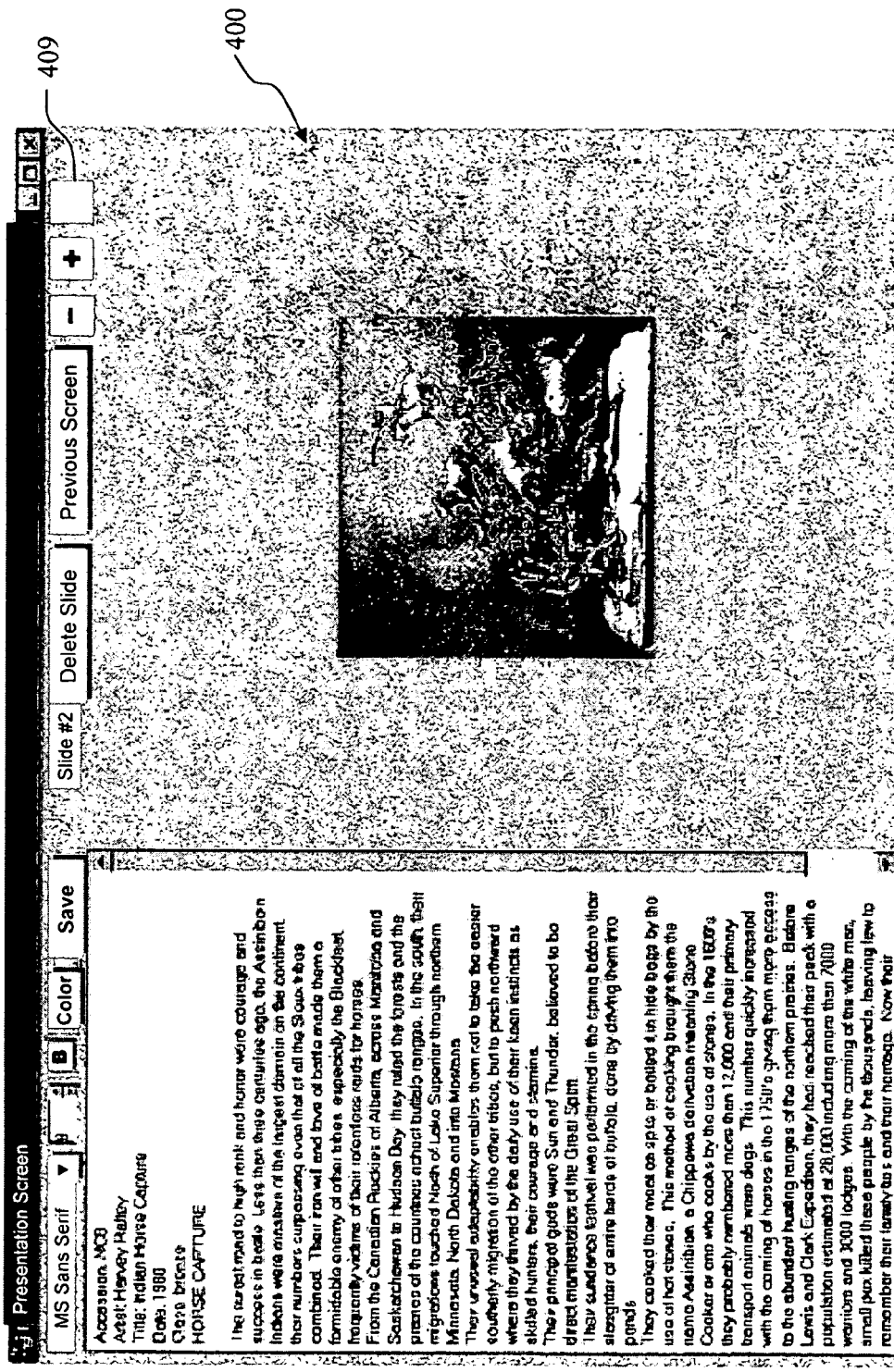
FIG. 22 shows the presentation screen associated with a presentation and displaying data for the second slide.

Once a record is found and selected from the non-collection database 22 in the presentation maintenance screen 450 the user selects either the insert button 342 or the append button 344 in section 340 of the presentation maintenance screen 450, as shown in FIG. 21. In the example shown, the "Append" button has been selected, and the selected record containing non-collection data appears as the second slide in the presentation. By double clicking on the selected slide record, presentation screen 400 associated with a presentation for displaying the slide data appears, as shown in FIG. 22. The second slide is then edited in a similar manner as the first slide described with respect to FIG. 19.

Figure 23:
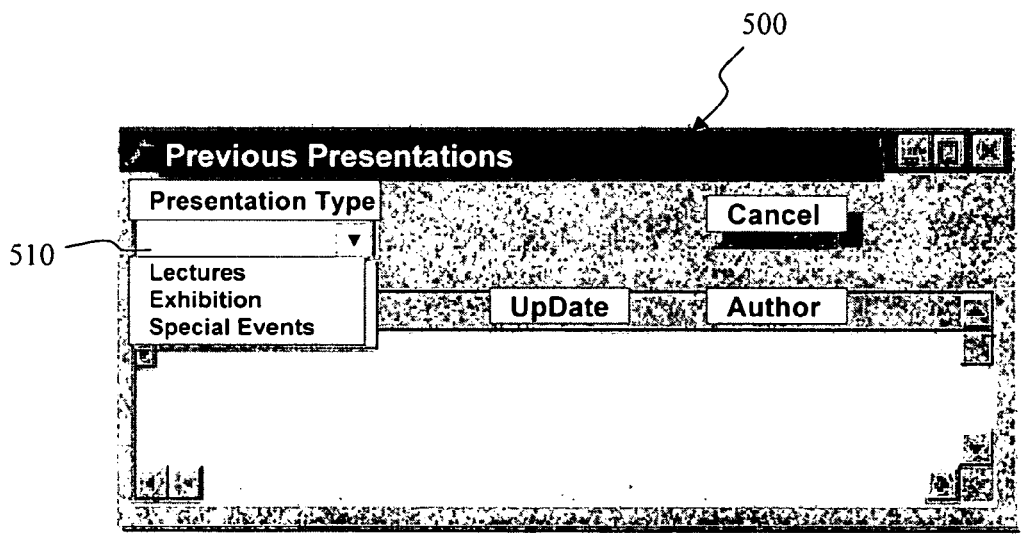
FIG. 23 is a section of the presentation maintenance screen for adding or deleting slides in a presentation from previous presentations utilizing a drop down menu to select from user defined presentation types.
Figure 24:
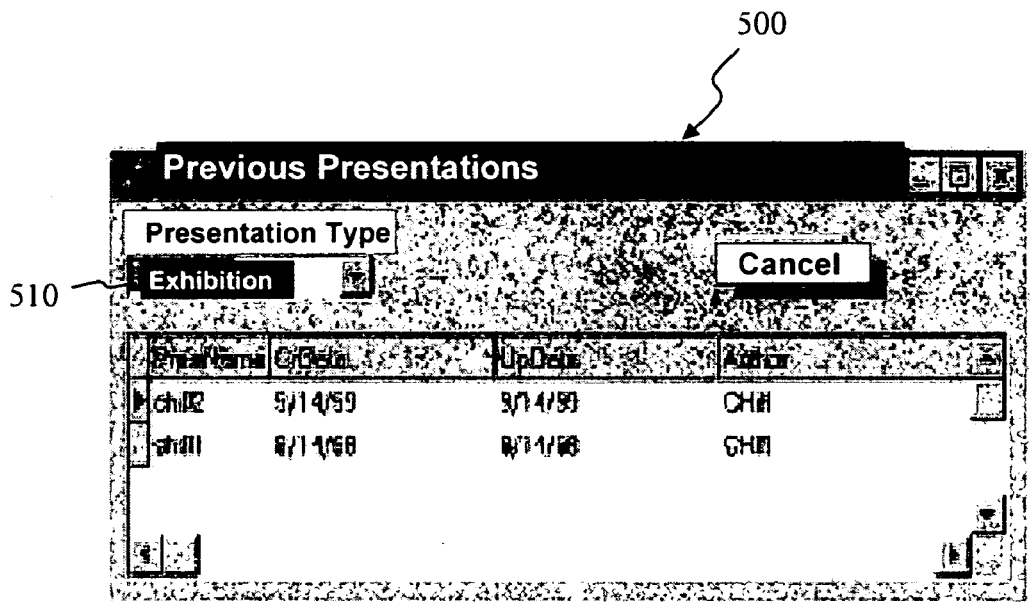
FIG. 24 is the section of the presentation maintenance screen for adding or deleting slides in a presentation from previous presentations, configured to search exhibition presentations.

A third way to create a slide for a presentation is to select a slide from a previous presentation. When the user selects the previous presentation button 323 from in the presentation manager screen 300, a previous presentation screen 500 appears. The previous presentation maintenance screen 500 allows a user to add or delete slides in a presentation from previous presentations utilizing a drop down menu 510 to select from user defined presentation types, as shown in FIG. 23. Illustratively, FIG. 24 shows a list of presentations present in response to the search query "Exhibition" being selected from drop down menu 510. A user may select one of the available presentations and browse through the slides in the presentations searching for relevant information. Once a slide is found that the user desires to include in a new presentation, the user selects either the insert button 342 or the append button 344 in section 340 of the presentation maintenance screen 300. The slide may then be edited, if necessary, and then saved to the current presentation.

Preferably, however, another option for selecting a slide from the presentation database 24 is to generate a query based upon one of the fields used in the collection database 20 and non-collection database 22. A query based upon one of the fields used in the collection database 20 and non-collection database 22 causes the system to search all previously generated presentations for slides meeting the search requirements. The system generates a list of slides meeting the search criteria and allows the user to select one or more slides to add to the current presentation under development. The ability to search previous presentations for slides meeting a specific search criteria results from retaining the intelligence of the presentation and each individual slide within the presentation. Each of the slides in a presentation contains with it the collection database 20 and non-collection database 22 data fields. Thus, the slides may be searched using a common methodology that is also applicable to the collection database 20 and non-collection database 22.

Figure 26:
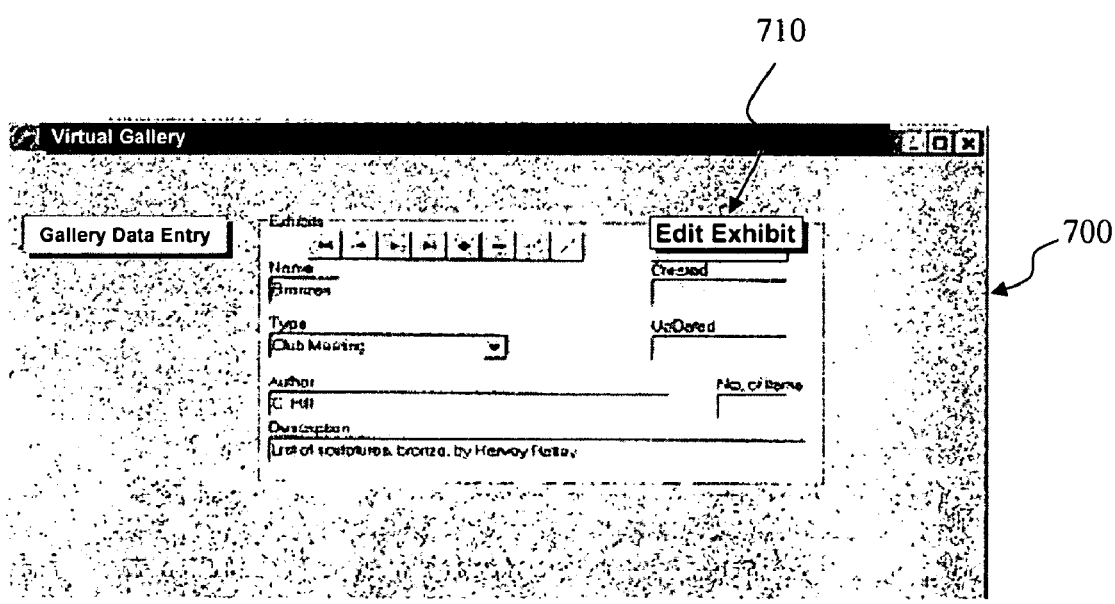
FIG. 26 is an exhibit definition screen for creating an exhibit.
Figure 25:
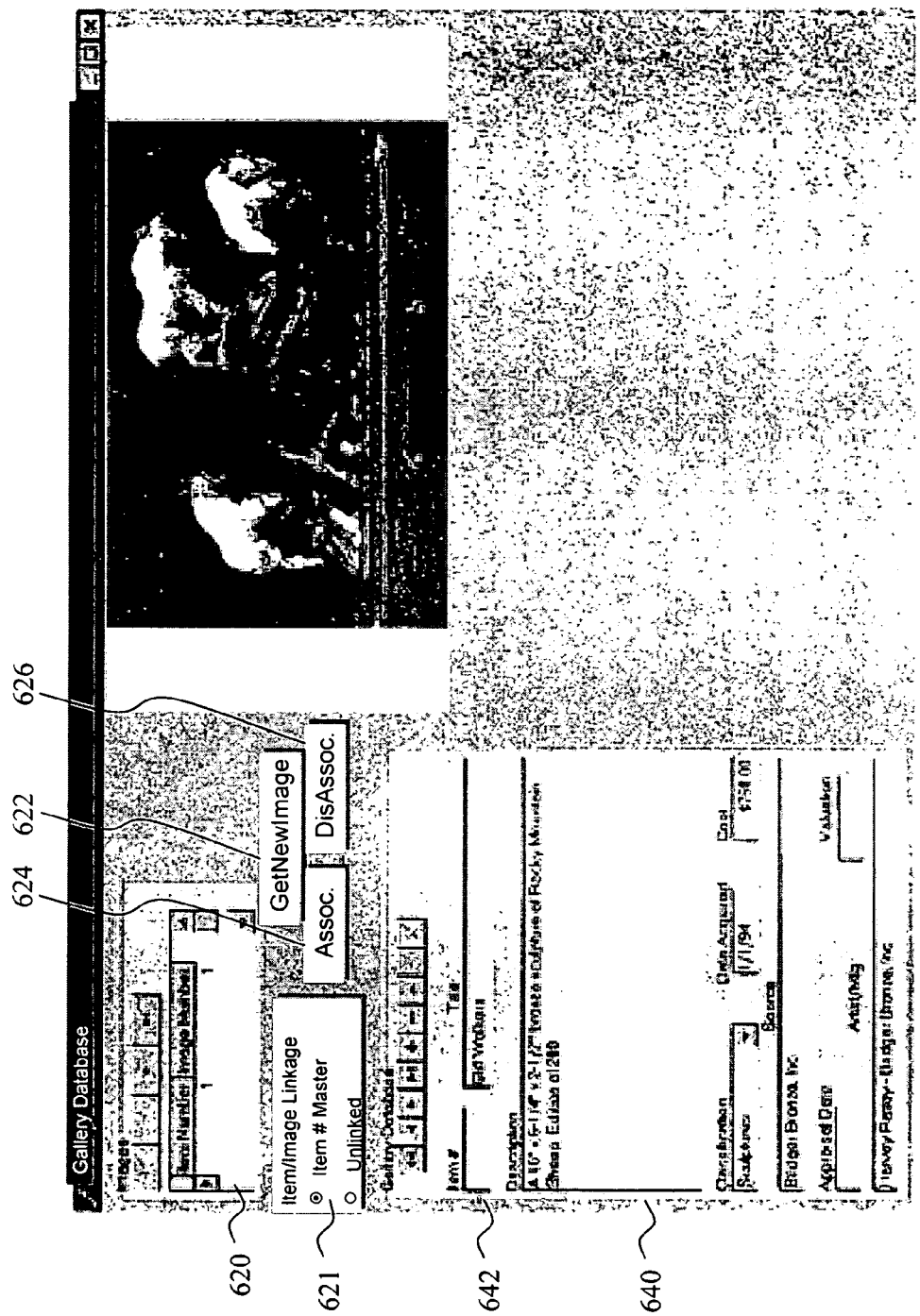
FIG. 25 is a screen display associated with an alternative embodiment of the invention that allows a user to define a personal gallery database.

In an alternative embodiment of the invention as presently perceived, a user may create a single "personal gallery" database. Creating a personal gallery database integrates textual descriptions of a user's pieces with images of the user's pieces, and further creates a searchable database with user defined key fields. FIG. 26 shows the gallery database screen 600 associated with the alternative embodiment of the invention directed creating a personal gallery database, and generating presentations from this database. There are three subsections in the gallery database screen 600: section 620 of gallery database screen 600 provides navigation, editing and association of the graphics files; section 640 of the of gallery database screen 600 provides editing and navigation functions for gallery database; and section 660 of the gallery database screen 600 provides a viewing area of the selected graphics image. Data in the gallery database is keyed off an item number in item field 642.

Section 620 includes an item/master linkage toggle box 621 an associate button 624, a disassociate button 626, and a get new image button 622. Associate button 624 and disassociate button 626 allow a user to associate or disassociate images with a specific item number. When the item master radio button in item/master linkage toggle box 621 has been selected, only images associated to the selected item number will be displayed. Should a user want to disassociate an image with an item number, the user can select the disassociate button 626.

Figure 27:
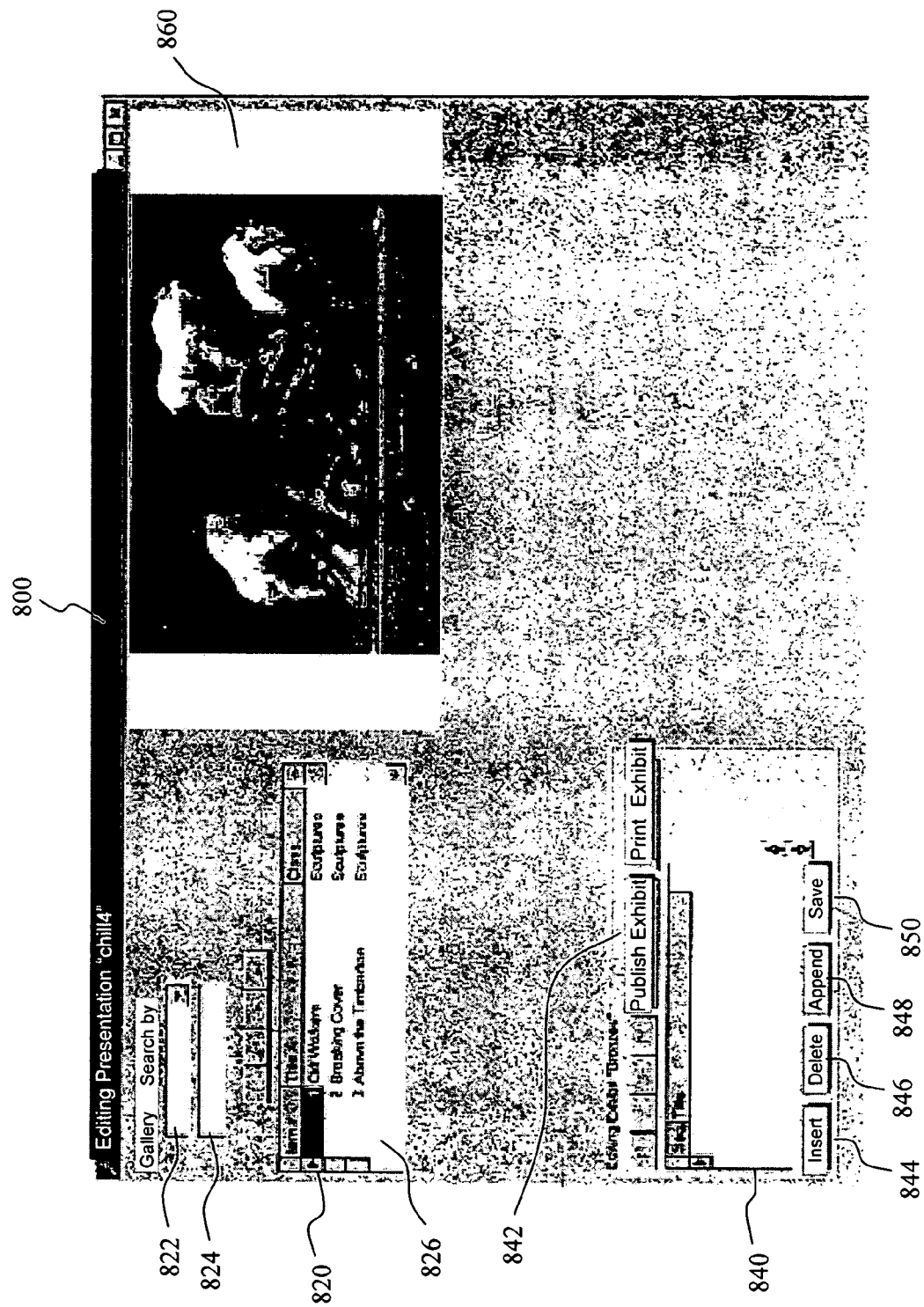
FIG. 27 is an exhibit edition screen for editing an exhibit.

A personal gallery database may be used to create an exhibit. An exhibit is a sequential slide display of image files and associated textual information. FIG. 26 shows the exhibit definition screen 700 for creating an exhibit. The exhibit name, author and description field are filled in by a user to create an exhibit. Pressing the edit exhibit button 710 invokes an exhibit editing screen 800, as shown in FIG. 27. Exhibit editing screen includes three sections: Section 820 is used to search and select records from the gallery database; section 840 is used to add or delete slides from an exhibit, and section 860 provides a viewing area of the selected graphics image.

To search for specific collection pieces in a gallery database, a user selects one of the catalog fields in the drop down menu 822. Once the applicable search field is selected, the user enters the search data in the data field 824. Thus, if a user desired to build an exhibit for all pieces acquired in the year 1996, the user would select "Year Acquired" in the drop down menu 822, and enter "1996" in the data field 824. The system would then automatically find all pieces that have been cataloged with an acquisition year of 1996.

Once a list of corresponding records is generated in search results window 826, the user may add the record and corresponding data to an exhibit by selecting the record in the search results window 826 and using the insert button 844 or the append button 848. Unwanted records are deleted from an exhibit by pressing the delete button 846. Once an exhibit is complete, the user selects the save button 850 to save the exhibit as an exhibit file.

Figure 28:
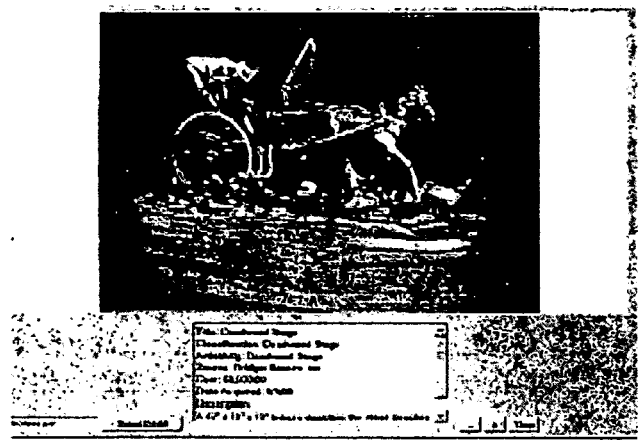
FIG. 28 is a first screen of an exhibit.
Figure 29:
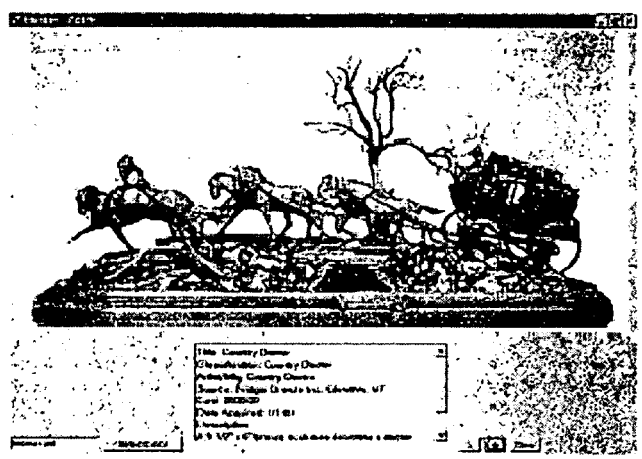
FIG. 29 is a second screen of an exhibit.
Figure 30:
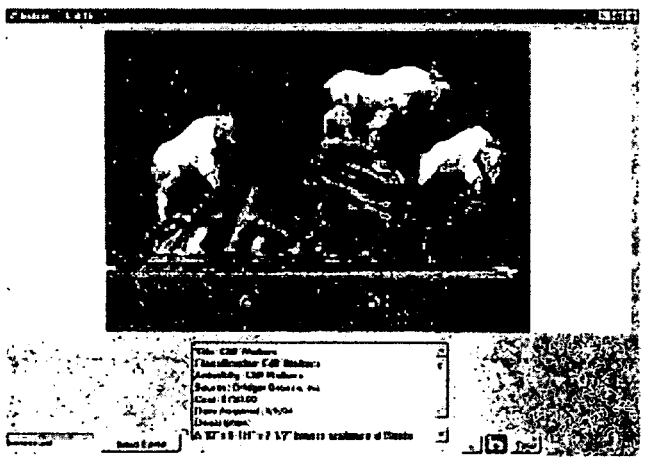
FIG. 30 is a third screen of an exhibit.

Illustratively, FIGS. 28-30 show a sequence of three images of a user's collect and associated data. All data fields associated with each image are shown. However, should a user decide to show the exhibit to others but want to suppress certain data, such as cost, the user selects the publish button 842, which allows the user to select which fields shall be shown. Thus, the user may freely "publish" the exhibit without having to disclose sensitive or personal information.

In another exemplary embodiment of the invention, a user may organize photographs into photo storybooks. As photographs are stored, the user catalogs each image file. The data fields associated with the cataloging of these images are used to intelligently link the photographs and create photo storybooks. A user searches the data fields associated with the image files for image files of interest, and links these files together in a photo storybook, creating a presentation similar to the presentation shown in FIGS. 28-30. The photo storybook includes further text fields which may be edited to include text regarding the subject of the photo storybook. Such subjects may be photos from a vacation, wedding photos, or the like. Acquiring an image and building a photo storybook is described with reference to pages 1-4 of Exhibit A, the disclosure of which is incorporated herein by reference.

Although the invention has been described in detail with reference to certain exemplary embodiments, variations and modifications exist with the scope and spirit of the present invention as defined and described in the following claims.

What is claimed is:

1. A method of presenting electronic data, the method comprising the steps of:
   receiving a search request including a search criteria;
   identifying based on the search criteria a first subset of data;
   providing the first subset of data;
   receiving a selection of presentation data from the first subset of data for inclusion in a presentation; and
   associating the presentation data with the respective data in the first subset that the presentation data was selected from to permit searching of the presentation data such that a subsequent search based on the search criteria locates the first subset of data and the presentation data, wherein the first subset of data includes a plurality of images each having at least one associated data fields and the associating step comprises including the at least one associated data field of the image selected for inclusion in the presentation within the presentation.

2. The method of claim 1, wherein the at least one data filed is associated with a slide of the presentation, the slide containing the image selected for inclusion in the presentation.

3. The method of claim 1, wherein the text data, the graphical data, and the presentation data are stored in at least one database accessible over a network.

4. The method of claim 1, wherein the data is accessible over a network.

5. The method of claim 4, wherein the data is stored in at least one distributed database.

6. The method of claim 4, wherein the data is stored in at least one database.

7. The method of claim 1, wherein the data includes text data and graphical data.

8. The method of claim 7, wherein the text data and the graphical data are accessible over a network.

9. The method of claim 7, wherein the text data is stored in a first database and the graphical data is stored in a second database.

10. The method of claim 9, wherein the presentation data is stored in a third database.

11. The method of claim 10, wherein the step of identifying the first subset of data includes searching the first database, the second database, and the third database for data that satisfies the search criteria.

12. The method of claim 10, wherein the associating step includes intelligently linking the presentation data to the respective text data and graphical data in the first and second databases that the presentation data was selected from with intelligence information.

13. A computer readable medium comprising:
instructions which when executed by a processor enable a method of presenting electronic data comprising the steps of:
receiving a search request including a search criteria;
identifying based on the search criteria a first subset of data;
providing the first subset of data;
receiving a selection of presentation data from the first subset of data for inclusion in a presentation, the selected presentation data including an image;
associating the presentation data with the respective data in the first subset that the presentation data was selected from to permit searching of the presentation data such that a subsequent received search request based on the same search criteria locates the first subset of data and the image of the presentation data, wherein the first subset of data includes a plurality of images each having at least one associated data fields and the associating step comprises including the at least one associated data field of the image selected for inclusion in the presentation within the presentation.

14. The computer readable medium of claim 13, wherein the at least one data filed is associated with a slide of the presentation, the slide containing the image selected for inclusion in the presentation.

15. The computer readable medium of claim 13, wherein the text data, the graphical data, and the presentation data are stored in at least one database.

16. The computer readable medium of claim 13, wherein the data is accessible over a network.

17. The method of claim 16, wherein the data is stored in at least one distributed database.

18. The method of claim 16, wherein the data is stored in at least one database.

19. The computer readable medium of claim 13, wherein the data includes text data and graphical data.

20. The computer readable medium of claim 19, wherein the text data and the graphical data are accessible over a network.

21. The computer readable medium of claim 19, wherein the text data is stored in a first database and the graphical data is stored in a second database.

22. The computer readable medium of claim 21, wherein the presentation data is stored in a third database.

23. The computer readable medium of claim 22, wherein the step of identifying the first subset of data includes searching the first database, the second database, and the third database for data that satisfies the search criteria.

24. The computer readable medium of claim 22, wherein the associating step includes intelligently linking the presentation data to the respective text data and graphical data in the first and second databases that the presentation data was selected from with intelligence information.

* * * * *